United States Patent
Ide et al.

(10) Patent No.: US 10,577,243 B2
(45) Date of Patent: Mar. 3, 2020

(54) REFORMING CATALYST

(71) Applicant: ExxonMobil Research and Engineering Company, Annandale, NJ (US)

(72) Inventors: Matthew S. Ide, Raritan, NJ (US); John F. Brody, Bound Brook, NJ (US); Jianxin Wu, Clinton, NJ (US); Joshua W. Allen, Raritan, NJ (US); Frank Hershkowitz, Basking Ridge, NJ (US); Arsam Behkish, Flemington, NJ (US); Anastasios I. Skoulidas, Pittstown, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/343,778

(22) Filed: Nov. 4, 2016

(65) Prior Publication Data

US 2017/0137285 A1    May 18, 2017

Related U.S. Application Data

(60) Provisional application No. 62/256,860, filed on Nov. 18, 2015.

(51) Int. Cl.
*C01B 3/40* (2006.01)
*B01J 23/10* (2006.01)
(Continued)

(52) U.S. Cl.
CPC .............. *C01B 3/40* (2013.01); *B01J 8/0438* (2013.01); *B01J 8/0442* (2013.01); *B01J 8/0492* (2013.01);
(Continued)

(58) Field of Classification Search
CPC ....................................................... C01B 3/40
See application file for complete search history.

(56) References Cited

U.S. PATENT DOCUMENTS

| 5,155,085 A | * | 10/1992 | Hamano | .................. B01J 23/10 423/625 |
| 7,217,303 B2 | | 5/2007 | Hershkowitz et al. | |

(Continued)

FOREIGN PATENT DOCUMENTS

| WO | 2006130280 A2 | 12/2006 |
| WO | WO 2014/182020 | * 11/2014 |

OTHER PUBLICATIONS

PCT/US2016/060528 International Search Report and Written Opinion dated Feb. 24, 2017.

*Primary Examiner* — Douglas B Call
(74) *Attorney, Agent, or Firm* — Liza Negron

(57) ABSTRACT

A reforming catalyst with improved surface area is provided by using high surface area alumina doped with a stabilizer metal as a catalyst support. The surface area of the catalyst can be higher than a typical reforming catalyst, and the surface area can also be maintained under high temperature operation. This can allow use of the catalyst for reforming in a higher temperature environment while maintaining a higher surface area, which can allow for improved dispersion and/or activity of an active metal such as rhodium on the catalyst support. The catalyst can be suitable for production of syngas from natural gas or other hydrocarbon-containing feeds.

9 Claims, 6 Drawing Sheets

(51) Int. Cl.
    *B01J 23/46*     (2006.01)
    *B01J 23/63*     (2006.01)
    *B01J 35/04*     (2006.01)
    *B01J 35/10*     (2006.01)
    *B01J 37/02*     (2006.01)
    *B01J 37/08*     (2006.01)
    *B01J 38/02*     (2006.01)
    *B01J 23/89*     (2006.01)
    *B01J 8/04*     (2006.01)
    *B01J 23/83*     (2006.01)
    *B01J 35/00*     (2006.01)
    *B01J 37/00*     (2006.01)
    *C01B 3/46*     (2006.01)

(52) U.S. Cl.
CPC ............ *B01J 8/0496* (2013.01); *B01J 23/10* (2013.01); *B01J 23/464* (2013.01); *B01J 23/63* (2013.01); *B01J 23/83* (2013.01); *B01J 23/894* (2013.01); *B01J 35/0066* (2013.01); *B01J 35/04* (2013.01); *B01J 35/1014* (2013.01); *B01J 35/1019* (2013.01); *B01J 37/0215* (2013.01); *B01J 37/08* (2013.01); *B01J 38/02* (2013.01); *B01J 37/0009* (2013.01); *B01J 37/0036* (2013.01); *B01J 37/0201* (2013.01); *B01J 37/0228* (2013.01); *B01J 37/088* (2013.01); *B01J 2208/00309* (2013.01); *B01J 2523/00* (2013.01); *C01B 3/46* (2013.01); *C01B 2203/0233* (2013.01); *C01B 2203/0238* (2013.01); *C01B 2203/0283* (2013.01); *C01B 2203/0811* (2013.01); *C01B 2203/1023* (2013.01); *C01B 2203/1047* (2013.01); *C01B 2203/1064* (2013.01); *C01B 2203/1082* (2013.01); *C01B 2203/1235* (2013.01); *C01B 2203/1241* (2013.01); *C01B 2203/1623* (2013.01); *C01B 2203/1695* (2013.01)

(56) References Cited

U.S. PATENT DOCUMENTS

| | | |
|---|---|---|
| 7,491,250 B2 | 2/2009 | Hershkowitz et al. |
| 7,503,948 B2 | 3/2009 | Hershkowitz et al. |
| 7,740,829 B2 | 6/2010 | Becker et al. |
| 7,815,873 B2 | 10/2010 | Sankaranarayanan et al. |
| 8,454,911 B2 | 6/2013 | Hershkowitz et al. |
| 8,551,444 B2 | 10/2013 | Agnihotri et al. |
| 2004/0138060 A1* | 7/2004 | Rapier ............... B01J 21/04 502/302 |
| 2004/0265225 A1 | 12/2004 | Watson et al. |
| 2005/0265920 A1* | 12/2005 | Ercan ............... B01J 21/04 423/651 |
| 2009/0314993 A1 | 12/2009 | Zhang et al. |
| 2011/0147267 A1 | 6/2011 | Kaul et al. |
| 2012/0004098 A1* | 1/2012 | Xiao ............... B01J 21/18 502/185 |
| 2014/0191449 A1 | 4/2014 | Schunk et al. |
| 2016/0030927 A1* | 2/2016 | Suh ............... B01J 35/04 252/373 |

* cited by examiner

REFORMING CATALYST

CROSS-REFERENCE TO RELATED APPLICATIONS

This application claims priority to U.S. Provisional Application Ser. No. 62/256,860 filed on Nov. 18, 2015, herein incorporated by reference in its entirety

FIELD

This invention relates to a reforming catalyst and corresponding systems and methods for reforming in the presence of the reforming catalyst.

BACKGROUND

Increasing amounts of available petroleum feedstocks correspond to natural gas sources or other methane-containing sources. The increased availability of methane and/or small hydrocarbon petroleum sources can potentially have increased value if efficient methods can be identified for conversion to larger compounds.

One option for converting methane (and other small hydrocarbons) to other compounds is to reform the methane to form $H_2$ and/or CO (i.e., synthesis gas). Both steam reforming and dry reforming are known, but each type of reforming poses a variety of challenges. In particular, both types of reforming processes are prone to formation of coke on the reforming catalyst. This is especially true when the natural gas feed contains elevated levels of $CO_2$ and/or $C_2+$ hydrocarbon molecules, such as ethane or propane. In such cases, conventional reforming processes employ additional gas separations processes to reduce the $CO_2$ content to acceptable levels—about 18-20% for steam reforming processes and much lower, about 5%, for autothermal reforming processes—or a prereformer to convert $C_2+$ hydrocarbons to carbon monoxide and hydrogen.

These pretreatments increases the capital and operating expenses of reformning processes. Moreover, natural gas streams with high amounts of $CO_2$ and/or $C_2+$ hydrocarbons are more likely to be used as low cost fuels rather than for the production of high margin products through their conversion into synthesis gas, and are thus cost suppressed.

U.S. Pat. No. 8,454,911 describes methods of using a reverse flow reactor for reforming of methane to form acetylene.

U.S. Pat. No. 7,217,303 describes methods for pressure swing reforming of a hydrocarbon fuel in the presence of steam to form hydrogen. The reforming step is described as having a peak temperature of 700° C. to 2000° C.

U.S. Pat. No. 7,815,873 describes methods for reforming of a hydrocarbon fuel in a reverse flow reactor configuration. The reforming step is described as having a temperature of at least 1000° C.

SUMMARY

In an aspect, a catalyst is provided comprising about 0.1 wt % to about 10.0 wt % of a Group VIII metal, a Group IX metal, or a combination thereof on a lanthanum-stabilized alumina support, the lanthanum-stabilized alumina support having a thermally stable surface area of about 10 $m^2/g$ to about 60 $m^2/g$, or at least about 20 $m^2/g$, or at least about 25 $m^2/g$, or at least about 30 $m^2/g$, and/or about 50 $m^2/g$ or less. Optionally, the Group VIII metal, Group IX metal, or combination thereof can have a dispersion value of at least 0.20, or at least 0.25, or at least 0.30, or at least 0.35. Optionally, the catalyst can be deposited on a surface of a monolith having an average wetted surface area per unit volume that ranges from about 50 $ft^{-1}$ to about 3000 $ft^{-1}$, or from about 100 $ft^{-1}$ to 2500 $ft^{-1}$, or from about 200 $ft^{-1}$ to 2000 $ft^{-1}$, the monolith optionally comprising alumina, zirconia, silicon carbide, or a combination thereof.

In another aspect, a method for forming a catalyst is provided, the method comprising depositing about 1.0 wt % to about 15.0 wt % of lanthanum, relative to a weight of support, on an alumina support having a first support surface area of at least about 150 $m^2/g$; calcining the alumina support at a temperature of at least about 800° C. for about 0.5 hours to about 24 hours to form a lanthanum-stabilized alumina support having a thermally stable surface area of about 10 $m^2/g$ to about 60 $m^2/g$; and depositing about 0.1 wt % to about 10.0 wt % of a Group VIII metal, Group IX metal, or combination thereof, relative to a weight of support, on the lanthanum-stabilized alumina support.

In some aspects, a catalyst as described herein can be suitable for reforming a hydrocarbon-containing stream by exposing a hydrocarbon-containing stream to the catalyst in the presence of at least one of $H_2O$ and $CO_2$ under effective reforming conditions to form a synthesis gas product having an $H_2$ to CO ratio of about 0.1 to about 15, or about 0.1 to about 10, or about 0.5 to about 3.5. Optionally, the effective reforming conditions can comprise at least one of an average reforming zone temperature of at least about 1000° C. or a peak reactor temperature of at least about 1200° C. Optionally, the hydrocarbon-containing stream can be exposed to the catalyst in a reverse flow reactor.

DETAILED DESCRIPTION OF THE EMBODIMENTS

Figure 1:
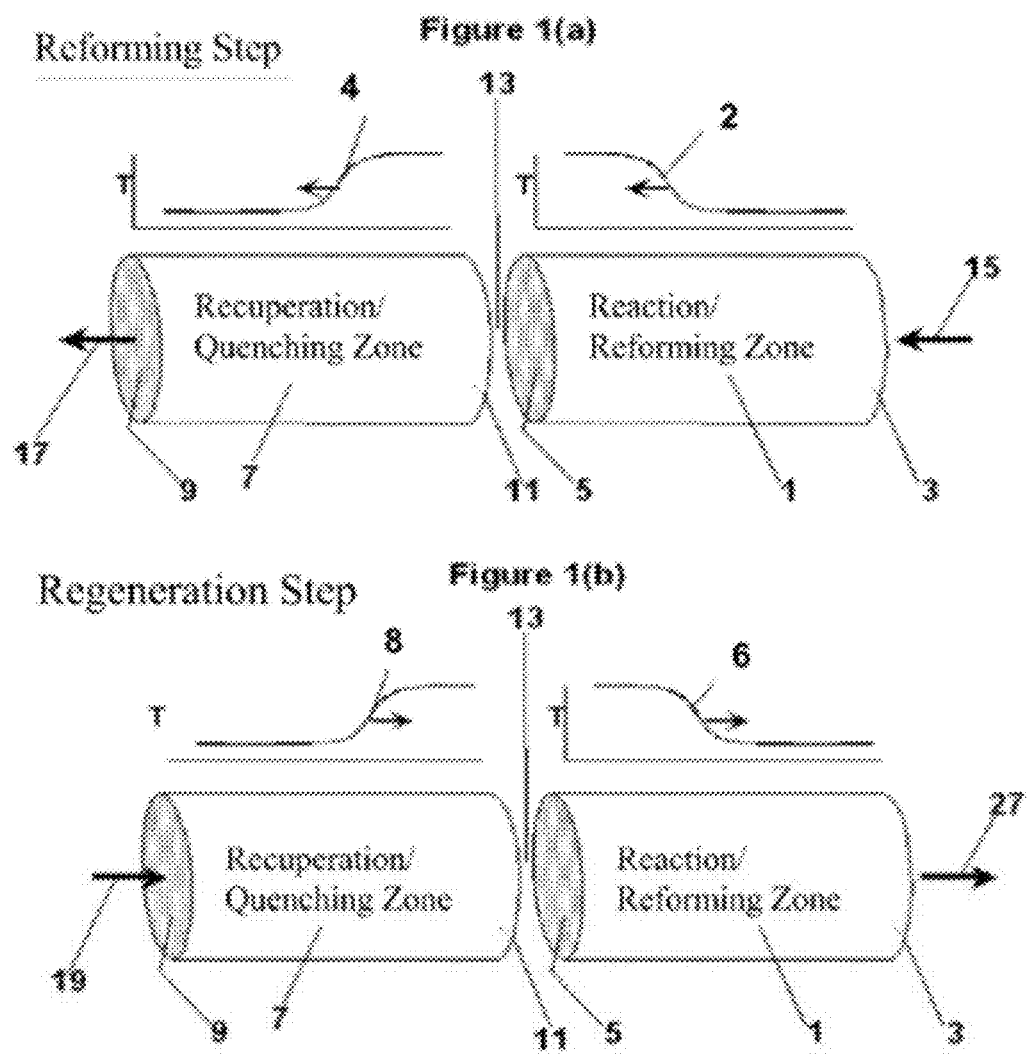
FIG. 1 schematically shows an example of operation of a reverse flow reactor.

In various aspects, a reforming catalyst with improved surface area can be provided. The surface area of the catalyst can be higher than a typical reforming catalyst, and the surface area can also be maintained under high temperature operation. This can allow use of the catalyst for reforming in a higher temperature environment while maintaining a high surface area, which can allow for improved dispersion and/or activity of an active metal (such as rhodium) on the catalyst support. The catalyst can be suitable for production of syngas from natural gas or other hydrocarbon-containing feeds. The syngas can then be used, for example, for the production of methanol, dimethyl ether, hydrocarbon fuels, lube basestocks, and/or as a source of hydrogen, as well as for any other reasonable application.

The high surface area of the catalyst can include a catalyst support formed from an alumina with a higher surface area than the target final surface area for the catalyst support. To form the catalyst support, the higher surface area alumina can be impregnated with lanthanum (or otherwise have lanthanum added to the surface) and then can be heated to anneal or sinter the catalyst support. Due to the presence of the lanthanum, the heating can convert the alumina in the catalyst support to a thermally stable high surface area phase, such as a lanthanum-stabilized theta-alumina phase. The lanthanum-stabilized alumina support can maintain this high surface area phase under repeated high temperature cycles, thus allowing the catalyst to maintain a higher activity under conditions that normally result in lower activity. This is in contrast to a conventional alumina support, which can eventually form a low surface area phase when exposed to high temperature cycles. Similarly, a support that does not have a surface area that is sufficiently higher than a theta-alumina phase prior to introduction of the lanthanum will also eventually form a low surface area phase. Alpha-alumina is an example of a low surface area phase that conventionally can form as an alumina support is exposed to high temperatures over time and/or high temperature cycles.

One potential concern of using a higher surface area and/or higher activity catalyst can be formation of coke on the catalyst. Conventional natural gas reforming technology can typically involve steam reforming in the presence of a nickel-based catalyst. The conventional technology typically utilizes excess steam to suppress carbon deposition on the nickel-containing catalyst during steam methane reforming. However, even with an excess of steam, a natural gas feed with an abundance of $C_2+$ hydrocarbons and/or carbon dioxide can still relatively quickly coke a nickel-containing reforming catalyst. This can lead to catalyst deactivation and potentially an increase in pressure drop across a conventional reforming reactor, which can typically be a tubular reactor.

In various aspects, one or more of the above concerns can be reduced or mitigated based on the use of a thermally stable, high surface area reforming catalyst. For example, performing a reforming reaction as a pressure swing reforming (PSR) process in a reverse flow reactor (RFR) can couple the highly endothermic reforming reaction with an exothermic combustion reaction in a reaction cycle. A thermally stable, high surface area reforming catalyst as described herein can remain stable during high temperature service in a cyclic oxidizing and reducing environment. This can allow a reverse flow reactor to be used for a cyclic reforming process in a commercial setting. Additionally or alternately, the thermally stable, high surface area catalysts described herein, such as a monolith with a washcoat of a high surface area rhodium-containing catalyst, can be capable of performing steam reforming, dry reforming, and/or bi-reforming (both $H_2O$ and $CO_2$ present) with reduced or minimized deactivation.

With regard to potential coke formation on the thermally stable, high surface area catalyst, by using a reverse flow reactor, the catalyst can periodically be exposed to a high temperature in the presence of an oxidant. This can lead to removal of coke as carbon dioxide, resulting in a reduced or minimized amount of coke on the catalyst. Because the catalyst can maintain the increased surface area in the presence of high temperature, this periodic regeneration can advantageously not lead to a substantial loss in activity, due to reduction of the catalyst surface area. Additionally and relatedly, reverse flow reactors using the catalyst can accommodate hydrocarbon streams with high amounts of $CO_2$ and/or $C_2+$ hydrocarbons without the need for additional pretreatments, such as gas separations or conversion of $C_2+$ hydrocarbons to carbon monoxide.

In some aspects, due to the high surface area and/or high regeneration temperature, the catalyst can additionally or alternatively allow for dry reforming to be performed in an improved manner. Conventionally, reforming in the presence of substantial amounts of $CO_2$ can pose difficulties, due to increased coke formation during the reforming process. For conventional catalysts, the coke formed during dry reforming can be difficult to remove and can, in some instances, lead to reduced dispersion of catalytic metal ("catalyst sintering") and/or to damaged catalyst particles ("catalyst dusting"). The high surface area catalysts described herein can reduce and/or minimize the amount of coke formed during reforming in the presence of $CO_2$, such as in a dry reforming process. Additionally, because the catalyst can retain a high surface area during high temperature cycles, the regeneration can be performed at sufficiently high temperatures to volatilize coke formed on the catalyst as carbon oxides.

In some aspects, the catalyst and reaction system can allow for improved treatment of natural gas or other methane-containing feeds that have elevated sulfur content. Many processes that use hydrogen and/or synthesis gas as an input can have particular sensitivity to sulfur. The higher surface area catalysts described herein advantageously have an improved ability to adsorb sulfur, which can then be desorbed during regeneration after conversion to $SO_x$ in the oxidizing environment of the regeneration process. The improved ability to adsorb sulfur can also include an increased capacity for adsorption. As a result, the catalyst can be effective for removing trace amounts of sulfur during reforming. During regeneration, the regeneration effluent can also have an increased content of $SO_x$ relative to a conventional regeneration cycle for a reforming catalyst, due to the increased adsorption of sulfur.

In this discussion, a support/catalyst with a thermally stable surface area is defined herein as a support/catalyst that has a surface area change of less than about 25% after exposure to a temperature of 1000° C. for 24 hours in an atmosphere comprising about 2 vol % to about 30 vol % $O_2$, optionally from about 5 vol % to about 30 vol % $O_2$ or from about 10 vol % to about 30 vol % $O_2$, and about 60 vol % to about 98 vol % of an inert gas, optionally from about 70 vol % to about 98 vol %, of inert gas, such as $N_2$ or a noble gas. Air is one example of a suitable atmosphere.

High Surface Area Reforming Catalyst

In various aspects, methane (or other hydrocarbon) reforming can be performed in the presence of a thermally stable high surface area catalyst. A thermally stable high surface area catalyst can provide various advantages. For example, an increased catalyst surface area can allow for increased dispersion of catalytic metals on a catalyst. In addition to providing higher activity, this can also allow a catalyst to be more resistant to activity losses, such as due to coking. As another example, a thermally stable catalyst can allow for increased temperatures during reforming and regeneration. In addition to potentially improving the rate of the reforming reaction, the ability to regenerate at high temperature can assist with removal of coke that does form during reforming.

Formation of a thermally stable high surface area catalyst can be initiated by starting with a sufficiently high area catalyst support material. An example of a suitable support material includes alumina, and in particular lanthanum-stabilized alumina. Alumina is a material that can have a wide variety of structural phases and properties, including both crystalline and amorphous phases. Under high temperature conditions, alumina can typically convert to a low surface area alpha phase. The low surface area alpha-alumina phase can have a surface area of about 1 $m^2/g$ or less.

In order to avoid conversion of an alumina support to an alpha-alumina phase under high temperature conditions, the alumina can be doped with a stabilizer. Lanthanides are, and in particular lanthanum is, one example of a suitable stabilizer for forming a high surface area alumina phase that is sufficiently thermally stable to avoid degradation to an alpha-alumina phase. Without being bound by any particular theory, it is noted that lanthanum oxide can be soluble in an aluminum oxide phase, and lanthanum can also potentially occupy lattice positions within an aluminum oxide structure. These features of lanthanum can potentially contribute to the ability of lanthanum to thermally stabilize a higher surface area phase of alumina, such as a theta-alumina phase.

In addition to lanthanides, zirconium is also known as a stabilizer for alumina, but may be more difficult to implement for providing a thermally stable high surface area phase. Zirconium is believed to be less effective as a stabilizer, as zirconium oxide can have a tendency to phase separate from aluminum oxide.

To form a stable theta-alumina phase, an initial alumina source with a sufficiently high surface area can be used as a starting material. The initial alumina can have a surface area of at least about 150 $m^2/g$, for example at least about 200 $m^2/g$, at least about 250 $m^2/g$, at least about 300 $m^2/g$, or at least about 350 $m^2/g$, such as up to about 800 $m^2/g$ or more. Examples of suitable types of alumina phases that can have a surface area of at least about 150 $m^2/g$ are amorphous phases and gamma-alumina. An example of a suitable source of high surface area alumina can be alumina synthesized from an alumina precursor, such as alumina (aluminum) hydroxide. Some mineral sources of alumina such as boehmite can additionally or alternatively provide a suitable source of high surface area alumina. The alumina can then be processed for use as a support, such as a support having a particle size between about 0.01 microns and about 10 mm.

Lanthanum or other suitable stabilizer can then be impregnated, coated, or otherwise deposited on the initial alumina support having a surface area of at least about 150 $m^2/g$ by any convenient method. Impregnation via incipient wetness with an aqueous solution containing lanthanum is one non-limiting example of a suitable method. Lanthanum nitrate hexahydrate is an example of a suitable lanthanum salt for impregnation. About 1.0 wt % to about 15 wt % of a stabilizer metal (relative to a weight of the support) can be deposited on the initial alumina support, for example from about 2.0 wt % to about 6.0 wt % or from about 3.0 wt % to about 5.0 wt %. More generally, the amount of stabilizer metal deposited on the support can be from about 1.0 wt % to about 15 wt %, from about 1.0 wt % to about 10 wt %, from about 1.0 wt % to about 8.0 wt %, from about 1.0 wt % to about 6.0 wt %, from about 1.0 wt % to about 5.0 wt %, from about 1.0 wt % to about 4.0 wt %, from about 1.0 wt % to about 3.0 wt %, from about 1.0 wt % to about 2.0 wt %, from about 2.0 wt % to about 15 wt %, from about 2.0 wt % to about 10 wt %, from about 2.0 wt % to about 8.0 wt %, from about 2.0 wt % to about 6.0 wt %, from about 2.0 wt % to about 5.0 wt %, from about 2.0 wt % to about 4.0 wt %, from about 2.0 wt % to about 3.0 wt %, from about 3.0 wt % to about 15 wt %, from about 3.0 wt % to about 10 wt %, from about 3.0 wt % to about 8.0 wt %, from about 3.0 wt % to about 6.0 wt %, from about 3.0 wt % to about 5.0 wt %, from about 3.0 wt % to about 4.0 wt %, from about 4.0 wt % to about 15 wt %, from about 4.0 wt % to about 10 wt %, from about 4.0 wt % to about 8.0 wt %, from about 4.0 wt % to about 6.0 wt %, from about 4.0 wt % to about 5.0 wt %, from about 5.0 wt % to about 15 wt %, from about 5.0 wt % to about 10 wt %, from about 5.0 wt % to about 8.0 wt %, from about 5.0 wt % to about 6.0 wt %, from about 6.0 wt % to about 15 wt %, from about 6.0 wt % to about 10 wt %, from about 6.0 wt % to about 8.0 wt %, from about 8.0 wt % to about 15 wt %, from about 8.0 wt % to about 10 wt %, or from about 10 wt % to about 15 wt %. Lower amounts of stabilizer metal can lead to only partial stabilization of theta phase alumina in a support, while higher amounts of a stabilizer metal such as lanthanum can lead to formation of low surface area lanthanum oxide.

As an example, an alumina support with a surface area of at least about 150 $m^2/g$ can be impregnated with an aqueous lanthanum solution via incipient wetness. The support can then be dried, followed by calcination at a temperature sufficient to decompose the impregnated lanthanum compound. A variety of temperature profiles can potentially be used for the heating steps to form the lanthanum-doped (or otherwise stabilized) alumina. For example, one or more initial drying steps can be used for drying the support, such as heating at a temperature from about 100° C. to about 200° C. for about 0.5 hours to about 24 hours. During the initial drying, the temperature can be maintained at a temperature below 200° C. in order to reduce or minimize reduction in surface area of the support. In some aspects, the initial drying step(s) can be optional.

The calcination to decompose the lanthanum compound (or decomposition process) can be at a temperature of about 200° C. to about 800° C. for an appropriate amount of time, depending on the temperature and/or on the nature of the impregnated stabilizer compound, e.g., from about 0.5 hours to about 24 hours. During the calcination to decompose the stabilizer compound, the temperature can be kept below about 800° C. to reduce or minimize conversion of the alumina support to a lower surface area phase. However, some reduction in surface area can occur. After decomposition, the surface area of the catalyst can be at least about 100 $m^2/g$, for example at least about 150 $m^2/g$, at least about 200 $m^2/g$, or at least about 250 $m^2/g$. Additionally or alternately, the surface area after decomposition of the lanthanum compound (or other stabilizer compound) can be similar to the surface area prior to decomposition, such as having a surface area after decomposition that differs by about 25 $m^2/g$ or less. In other aspects, the surface area after decomposition can be lower than the surface area prior to decomposition by about 25 $m^2/g$ to about 175 $m^2/g$, for example by about 25 $m^2/g$ to about 150 $m^2/g$, by about 50 $m^2/g$ to about 175 $m^2/g$, or by about 50 $m^2/g$ to about 150 $m^2/g$. In some aspects, the calcination to decompose the stabilizer can be optional, if the lanthanum or other stabilizer is sufficiently catalytically available without the decomposition.

The support can then be calcined at higher temperature to form the thermally stable high surface area phase. The calcination to form the thermally stable high surface area phase can include calcining at a temperature of about 800° C. to about 1500° C. for a period of about 30 minutes to about 72 hours, such as about 1 hour to about 24 hours. The resulting thermally stable support can have a surface area of about 10 $m^2/g$ to about 60 $m^2/g$, for example about 10 $m^2/g$ to about 50 $m^2/g$, about 20 $m^2/g$ to about 60 $m^2/g$, about 20 $m^2/g$ to about 50 $m^2/g$, about 25 $m^2/g$ to about 60 $m^2/g$, about 25 $m^2/g$ to about 50 $m^2/g$, about 30 $m^2/g$ to about 60 $m^2/g$, or about 30 $m^2/g$ to about 50 $m^2/g$. In some aspects, the thermally stable high surface area support can correspond to a theta-alumina phase, such as a lanthanum-doped theta-alumina phase.

The above drying, decomposition, and calcination processes can generally be referred to as a heating process for forming the high surface area support, such as a multi-stage heating process. In between stages of drying, decomposition, and/or calcination, the temperature of the support can be maintained at the temperature of the prior stage, or the temperature can be reduced to any convenient temperature, such as an ambient temperature. Optionally, a single stage of the heating process can include exposing the support to multiple temperatures. For example, a drying process could include heating to 100° C. for a period of time, followed by heating to 120° C. for a period of time, with an optional reduction of temperature in between. Such a drying process could be characterized as corresponding to a single multi-temperature stage or two drying stages at different temperatures.

After forming the support, one or more catalytic metals can be impregnated, coated, or otherwise deposited on the support. Examples of suitable metals can include, but are not limited to, Group VIII metals (Fe, Ru, Os, Co, Rh, Ir, Ni, Pd, and/or Pt), Group IX metals (Au and/or Ag), as well as combinations thereof. Both Group VIII noble metals and Group VIII non-noble metals may potentially be suitable, depending on the application for the catalyst. For applications where the catalyst is used at temperatures below 800° C., any Group VIII or Group IX metal may be suitable. At higher temperatures, some Group VIII metals or metal oxides and/or Group IX metals or metal oxides can become volatile and/or can tend to sinter/agglomerate. For higher temperature applications, the catalytic metal can be Rh, Ni, Co, Pd, Pt, and/or combinations thereof. Rh can be advantageous in some aspects due to a reduced tendency to sinter or agglomerate. Pd and Co can tend to have lower activities. Ni can tend to have an intermediate activity but may also lead to increased coke formation when $C_{2+}$ hydrocarbons are present in the feed. However, in combination with a suitable regeneration process and/or when a feed has a reduced or minimized content of $C_2+$ hydrocarbons, Ni can be suitable.

The amount of catalytic metal on the catalytic support can be characterized based on the weight of the metal itself, as opposed to an oxide or other compound containing the catalytic metal. The amount of catalytic metal on the high surface area support can be about 0.1 wt % to about 10 wt %, for example about 0.5 wt % to about 10.0 wt %, about 1.0 wt % to about 10 wt %, about 0.1 wt % to about 8.0 wt %, about 0.5 wt % to about 8.0 wt %, about 1.0 wt % to about 8.0 wt %, about 0.1 wt % to about 6.0 wt %, about 0.5 wt % to about 6.0 wt %, or about 1.0 wt % to about 6.0 wt %.

One option for impregnating a high surface area catalyst support with rhodium can be to impregnate via incipient wetness with an aqueous solution of rhodium nitrate hydrate. The impregnated support can then be dried and/or calcined for decomposition of the rhodium (or other catalytic metal precursor) in a manner similar to the drying or decomposition steps described above for formation of the support. A variety of temperature profiles can potentially be used for the heating steps to form the catalytic metal on the high surface area support. One or more initial drying steps can be used for drying the support, such as heating at a temperature from about 100° C. to about 200° C. for about 0.5 hours to about 24 hours. A calcination to decompose the catalytic metal precursor compound can be at a temperature of about 200° C. to about 800° C. for about 0.5 hours to about 24 hours, depending on the nature of the impregnated catalytic metal compound. Depending on the precursor for the catalytic metal, the drying step(s) and/or the decomposing calcination step(s) can be optional.

By supporting the catalytic metal on a high surface area support, the dispersion of the metal on the support can be improved. Dispersion of a metal generally refers to the availability of a metal for catalytic activity, and conceptually can be thought of as the relative amount of islands or agglomerations that the metal forms on the support. To the degree that a catalytic metal agglomerates to form islands, a portion of the catalytic metal can be in the interior of an island and therefore not available to catalyze reactions. A higher dispersion value can indicate a lower percentage of metal that is in the interior of an island or other agglomeration of the metal. Dispersion can be characterized, for example, based on the amount of chemisorption of a molecule, such as carbon monoxide, relative to the amount of catalytic metal in a catalyst. For this type of characterization, a dispersion value of 1.0 would indicate that all of the metal present on a surface is available for chemisorption. In various aspects, the catalytic metal on a catalyst can have a dispersion value as measured by CO absorption of at least about 0.20, or at least about 0.25, or at least about 0.30, or at least about 0.35, or at least about 0.40, with an obvious upper bound of about 1.0.

The catalyst (including support and catalytic metal) can then be used in any convenient manner. In some aspects, the catalyst can be used as part of a bed of catalyst particles. For example, the catalyst can optionally be combined with a binder, such as an alumina binder, and then extruded to form a desired catalyst particle size. A suitable binder can have a particle size of about 0.01 μm to about 0.5 μm, optionally about 0.05 μm to about 0.5 μm. Such particle sizes can represent particle diameters for roughly spherical particles.

In other aspects, the catalyst can be coated on a structure, such as a monolith structure that can reside within a reactor. To form a washcoat solution, the catalyst can optionally be combined with a binder, such as an alumina binder. The mixture of catalyst and binder can then be added to water to form an aqueous suspension having about 10 wt % to about 50 wt % solids, for example about 10 wt % to about 40 wt %, about 10 wt % to about 30 wt %, about 15 wt % to about 50 wt %, about 15 wt % to about 40 wt %, or about 15 wt % to about 30 wt % or less. The amount of binder relative to the amount of solids can be any convenient amount, and the amount of binder can vary depending on the porosity and/or roughness. It is noted that smaller particles may adhere to the monolith surface better in the initial layer, so addition of a binder can assist with providing smaller particle sizes in a mixture of catalyst and binder particles. Optionally, an acid can be added to the aqueous solution to reduce the pH so as to reduce or minimize agglomeration of the alumina catalyst and/or binder particles. For example, acetic acid or another suitable (organic) acid can be added to achieve a pH of about 3 to 4. The suspension can then be ball milled (or processed in another manner) to achieve a desired particle size for the catalyst particles, such as a particle size of about 0.5 μm to about 5 μm. After milling, the solution can be stirred until time for use so that the particles can be distributed substantially uniformly in the solution.

The washcoat solution can then be applied to a monolith structure to achieve a desired amount of catalyst (such as rhodium) on the monolith surface. As an example, in one aspect, a washcoat thickness of about 10 microns was achieved by forming a washcoat corresponding to about 10 wt % of the monolith structure. Any convenient type of monolith structure can be used to provide a substantial surface area for support of the catalyst particles. For example, an alumina monolith with about 100 to about 2000 cells per square inch can be used, where the cells traverse the length of the monolith. The washcoat can be applied to the monolith to form cells having inner surfaces coated with the catalyst. One option for applying the washcoat can be to dip or otherwise submerge the monolith in the washcoat. After clearing the cell channels of excess washcoat, the monolith can be dried and/or calcined. Drying can correspond to heating at ~100° C. to ~200° C. for ~0.5 hours to ~24 hours, while calcining can correspond to heating at ~200° C. to ~800° C. for ~0.5 hours to ~24 hours.

The monolith can be composed of a material suitable for use at the temperatures of the reaction environment. For example, stainless steel has a relatively low melting point and is typically not suitable for use with reaction environments having a temperature of greater than about 1000° C. or about 1200° C. Cordierite similarly has a melting point that may be too low for various applications. A relatively high volumetric heat capacity can also be beneficial so that the structure can retain heat during processing. In addition to alumina, other suitable materials can include zirconia, yttria, and/or silicon carbide.

An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- and/or three-dimensionally stacking such blocks above, behind, and beside each other. Monoliths can be attractive as reactor contents because they provide high heat transfer capacity with minimum pressure drop.

In some aspects, honeycomb monoliths can be characterized as having open frontal area (or geometric void volume) between about 40% and about 80%, and having conduit density between about 50 and about 2000 pores per square inch or between about 100 and about 1000 pores per square inch. For example, in one embodiment, the conduits may have a diameter/characteristic cell side length of only a few millimeters, such as on the order of about one millimeter. Reactor media components, such as the monoliths or alternative bed media, can provide for channels that include a packing with an average wetted surface area per unit volume that ranges from about 50 $ft^{-1}$ to about 3000 $ft^{-1}$, for example from about 100 $ft^{-1}$ to about 2500 $ft^{-1}$ or from about 200 $ft^{-1}$ to about 2000 $ft^{-1}$, based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 1A or 1B of FIG. 1.

Reactor media components can also provide for channels that include a packing that includes a high volumetric heat transfer coefficient (e.g., greater than or equal to 0.02 cal/cm$^3$s° C., greater than about 0.05 cal/cm$^3$s° C., or greater than 0.10 cal/cal/cm's° C.); that have low resistance to flow (low pressure drop); that have an operating temperature range consistent with the highest temperatures encountered during regeneration; that have high resistance to thermal shock; and/or that have high bulk heat capacity (e.g., at least about 0.10 cal/cm$^3$s° C. or at least about 0.20 cal/cm's° C.). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 1A and 1B of FIG. 1. The cited values are averages based upon the volume of reactor used for conveyance of a reactant.

In various aspects, adequate heat transfer rate can be characterized by a heat transfer parameter, $\Delta T_{HT}$, below about 500° C., for example below about 100° C. or below about 50° C. The parameter $\Delta T_{HT}$, as used herein, is the ratio of the bed-average volumetric heat transfer rate needed for recuperation to the volumetric heat transfer coefficient of the bed, hv. The volumetric heat transfer rate (e.g. cal/cm$^3$ sec) sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$ s° C.) and a specific surface area for heat transfer (av, e.g. cm$^2$/cm$^3$), often referred to as the wetted area of the packing.

Reforming and Regeneration Conditions

A thermally stable, high surface area catalyst as described herein can be suitable for reforming of hydrocarbons under steam reforming conditions in the presence of $H_2O$, under dry reforming conditions in the presence of $CO_2$, or under conditions where both $H_2O$ and $CO_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the regeneration step. During regeneration, fuel and an oxidant can be introduced into the reactor from a regeneration end of the reactor. The bed and/or monoliths in the regeneration portion of the reactor can absorb heat, but typically do not include a catalyst for reforming. As the fuel and oxidant pass through the regeneration section, heat can be transferred from the regeneration section to the fuel and oxidant. Combustion does not occur immediately, but instead the location of combustion can be controlled to occur in a middle portion of the reactor. The flow of the reactants can continue during the regeneration step, leading to additional transfer of the heat generated from combustion into the reforming end of the reactor.

After a sufficient period of time, the combustion reaction can be stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

FIG. 1 shows examples of the temperature profile within a reverse flow reactor during a reforming/regeneration cycle. In FIG. 1A, the reforming portion of the cycle is shown. As reforming occurs, the temperature in the reforming zone can be decreased, which can cause the temperature profile to appear to shift toward the middle of the reactor. The highest temperatures can tend to be present near the middle of the reactor, which is where the actual combustion reaction takes place during the regeneration portion of the cycle.

The reforming reaction performed within the reactor can correspond to reforming of methane and/or other hydrocarbons using steam reforming, in the presence of $H_2O$; using dry reforming, in the presence of $CO_2$; or using "bi" reforming in the presence of both $H_2O$ and $CO_2$. Examples of stoichiometry for steam, dry, and "bi" reforming of methane are shown in equations (1)-(3).

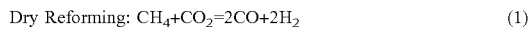

Dry Reforming: $CH_4+CO_2=2CO+2H_2$ (1)

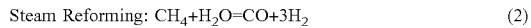

Steam Reforming: $CH_4+H_2O=CO+3H_2$ (2)

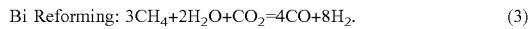

Bi Reforming: $3CH_4+2H_2O+CO_2=4CO+8H_2$. (3)

As shown in equations (1)-(3), dry reforming can produce lower ratios of $H_2$ to CO than steam reforming. Reforming reactions performed with only steam can generally produce a ratio of $H_2$ to CO of around 3, such as from about 2.5 to about 3.5. By contrast, reforming reactions performed in the presence of $CO_2$ can generate much lower ratios, possibly approaching a ratio of $H_2$ to CO of about 1 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of about 1 or about 3 for dry reforming and steam reforming, respectively, the equilibrium amounts of $H_2$ and CO in a synthesis gas can be different from the reaction stoichiometry. The equilibrium amounts can be determined based on the water gas shift equilibrium, which relates the concentrations of $H_2$, CO, $CO_2$ and $H_2O$ based on the following reaction.

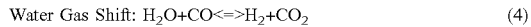

Water Gas Shift: $H_2O+CO<=>H_2+CO_2$ (4)

Most reforming catalysts, such as including rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium can also be temperature dependent, with higher temperatures favoring production of CO and $H_2O$. It is noted that higher temperatures may also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of about 0.1 to about 15, for example about 0.1 to about 10, about 0.1 to about 5.0, about 0.1 to about 3.0, about 0.5 to about 15, about 0.5 to about 10, about 0.5 to about 5.0, about 0.5 to about 3.0, about 1.0 to about 15, about 1.0 to about 10, about 1.0 to about 5.0, or about 1.0 to about 3.0, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen.

In some aspects, the feed for reforming can include from about 5 wt % to about 95 wt % of $C_2$+ compounds, such as ethane or propane, for example from about 5 wt % to about 90 wt %, from about 5 wt % to about 80 wt %, from about 5 wt % to about 70 wt %, from about 5 wt % to about 60 wt %, from about 5 wt % to about 50 wt %, from about 5 wt % to about 40 wt %, from about 5 wt % to about 30 wt %, from about 5 wt % to about 20 wt %, from about 5 wt % to about 15 wt %, from about 5 wt % to about 10 wt %, from about 10 wt % to about 95 wt %, from about 10 wt % to about 90 wt %, from about 10 wt % to about 80 wt %, from about 10 wt % to about 70 wt %, from about 10 wt % to about 60 wt %, from about 10 wt % to about 50 wt %, from about 10 wt % to about 40 wt %, from about 10 wt % to about 30 wt %, from about 10 wt % to about 20 wt %, from about 10 wt % to about 15 wt %, from about 15 wt % to about 95 wt %, from about 15 wt % to about 90 wt %, from about 15 wt % to about 80 wt %, from about 15 wt % to about 70 wt %, from about 15 wt % to about 60 wt %, from about 15 wt % to about 50 wt %, from about 15 wt % to about 40 wt %, from about 15 wt % to about 30 wt %, from about 15 wt % to about 20 wt %, from about 20 wt % to about 95 wt %, from about 20 wt % to about 90 wt %, from about 20 wt % to about 80 wt %, from about 20 wt % to about 70 wt %, from about 20 wt % to about 60 wt %, from about 20 wt % to about 50 wt %, from about 20 wt % to about 40 wt %, from about 20 wt % to about 30 wt %, from about 30 wt % to about 95 wt %, from about 30 wt % to about 90 wt %, from about 30 wt % to about 80 wt %, from about 30 wt % to about 70 wt %, from about 30 wt % to about 60 wt %, from about 30 wt % to about 50 wt %, or from about 30 wt % to about 40 wt %.

In another aspects, the feed for reforming can include from about 5 wt % to about 95 wt % of $CO_2$ for example from about 5 wt % to about 90 wt %, from about 5 wt % to about 80 wt %, from about 5 wt % to about 70 wt %, from about 5 wt % to about 60 wt %, from about 5 wt % to about 50 wt %, from about 5 wt % to about 40 wt %, from about 5 wt % to about 30 wt %, from about 5 wt % to about 20 wt %, from about 5 wt % to about 15 wt %, from about 5 wt % to about 10 wt %, from about 10 wt % to about 95 wt %, from about 10 wt % to about 90 wt %, from about 10 wt % to about 80 wt %, from about 10 wt % to about 70 wt %, from about 10 wt % to about 60 wt %, from about 10 wt % to about 50 wt %, from about 10 wt % to about 40 wt %, from about 10 wt % to about 30 wt %, from about 10 wt % to about 20 wt %, from about 10 wt % to about 15 wt %, from about 15 wt % to about 95 wt %, from about 15 wt % to about 90 wt %, from about 15 wt % to about 80 wt %, from about 15 wt % to about 70 wt %, from about 15 wt % to about 60 wt %, from about 15 wt % to about 50 wt %, from about 15 wt % to about 40 wt %, from about 15 wt % to about 30 wt %, from about 15 wt % to about 20 wt %, from about 20 wt % to about 95 wt %, from about 20 wt % to about 90 wt %, from about 20 wt % to about 80 wt %, from about 20 wt % to about 70 wt %, from about 20 wt % to about 60 wt %, from about 20 wt % to about 50 wt %, from about 20 wt % to about 40 wt %, from about 20 wt % to about 30 wt %, from about 30 wt % to about 95 wt %, from about 30 wt % to about 90 wt %, from about 30 wt % to about 80 wt %, from about 30 wt % to about 70 wt %, from about 30 wt % to about 60 wt %, from about 30 wt % to about 50 wt %, or from about 30 wt % to about 40 wt %.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion can be initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone.

As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At about 500° C., the reaction rate for reforming can be sufficiently reduced that little or no additional reforming should occur. As a result, in some aspects as the reforming reaction progresses, the beginning portion of the reforming zone can cool sufficiently to effectively stop the reforming reaction within a portion of the reforming zone. This can move the location within the reactor where reforming begins to a location further downstream relative to the beginning of the reforming zone. When a sufficient portion of the reforming zone has a temperature below about 500° C., or perhaps even below about 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) can roughly balance the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of at least about 1100° C., for example at least about 1200° C., at least about 1300° C., or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration can balance with the heat consumed during reforming.

In addition to providing heat, the regeneration step during a reaction cycle can also allow for regeneration of the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO. This coke can potentially block access to the catalytic sites (such as metal sites) of the catalyst. In some aspects, the rate of formation can be increased in portions of the reforming zone exposed to higher temperatures, such as portions of the reforming zone exposed to temperatures of at least about 800° C., for example at least about 900° C. or at least about 1000° C. During a regeneration step, oxygen can be present as the temperature of the reforming zone increases. At the temperatures achieved during regeneration, at least a portion of the coke generated during reforming can be removed as CO or $CO_2$.

Another type of regeneration can correspond to removal of sulfur from the catalyst. Generally, feeds for hydrocarbon reforming can be feeds with low sulfur content, such as feeds having a sulfur content of 10 wppm or less. This can be due in part to difficulties with adsorption of sulfur by reforming catalyst. However, the high surface area catalysts described herein can allow for regeneration cycles at high temperature, which can allow for removal of adsorbed sulfur as $SO_x$. Due to high dispersion of catalytic metal, the high surface area catalyst described herein can have an increased ability to adsorb sulfur relative to a conventional catalyst. This sulfur can then be removed during regeneration to produce a regeneration effluent with a higher than expected content of sulfur. In various aspects, the sulfur content of the regeneration effluent can be at least about 0.1 wppm, or at least about 0.2 wppm, or at least about 0.5 wppm, or at least about 1.0 wppm, such as up to about 10 wppm or less. It is noted that detection of this level of sulfur in the regeneration effluent can be achieved using a technique such as mass spectrometry. For example, a sample of the regeneration effluent can be collected for subsequent analysis using mass spectrometry.

Due to the variation in temperature across the reactor, several options can be used for characterizing the temperature within the reactor and/or within the reforming zone of the reactor. One option for characterizing the temperature can be based on an average bed and/or average monolith temperature within the reforming zone. In practical settings, determining a temperature within a reactor typically requires the presence of a measurement device, such as a thermocouple. Rather than attempting to measure temperatures within the reforming zone, an average (bed and/or monolith) temperature within the reforming zone can be defined based on an average of the temperature at the beginning of the reforming zone and a temperature at the end of the reforming zone. An additional or alternative option can be to characterize the peak temperature within the reforming zone after a regeneration step in the reaction cycle. Generally, the peak temperature can occur at or near the end of the reforming zone, and may be dependent on the location where combustion is initiated in the reactor. Another additional or alternative option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from about 400° C. to about 1200° C. (or more); a peak temperature within the reforming zone of about 800° C. to about 1500° C.; a temperature difference at the location of peak temperature of at least about 25° C., for example at least about 50° C., at least about 100° C., or at least about 200° C., between the end of a regeneration step and the end of the subsequent reforming step; a temperature difference at the entrance to the reforming zone of at least about 25° C., for example at least about 50° C., at least about 100° C., or at least about 200° C., between the end of a regeneration step and the end of the subsequent reforming step; and/or a temperature difference at the exit from the reforming zone of at least about 25° C., for example at least about 50° C., at least about 100° C., or at least about 200° C., between the end of a regeneration step and the end of the subsequent reforming step.

With regard to the average reforming zone temperature, in various aspects the average temperature for the reforming zone can be about 400° C. to about 1200° C., for example about 400° C. to about 1100° C., about 400° C. to about 1000° C., about 400° C. to about 900° C., about 500° C. to about 1200° C., about 500° C. to about 1100° C., about 500° C. to about 1000° C., about 500° C. to about 900° C., about 600° C. to about 1200° C., about 600° C. to about 1100° C., about 600° C. to about 1000° C., about 600° C. to about 900° C., about 700° C. to about 1200° C., about 700° C. to about 1100° C., about 700° C. to about 1000° C., about 800° C. to about 1200° C., or about 800° C. to about 1100° C. Additionally or alternately, with regard to the peak temperature for the reforming zone (likely corresponding to a location in the reforming zone close to the location for combustion of regeneration reactants), the peak temperature can be about 800° C. to about 1500° C., for example about 900° C. to about 1500° C., about 1000° C. to about 1500° C., about 1100° C. to about 1500° C., about 1200° C. to about 1500° C., about 800° C. to about 1400° C., about 900° C. to about 1400° C., about 1000° C. to about 1400° C., about 1100° C. to about 1400° C., or about 1200° C. to about 1400° C.

Additionally or alternatively, the reaction conditions for reforming hydrocarbons can include a pressure of about 0 psig to about 1500 psig (~10.3 MPa), for example about 0 psig to about 1000 psig (~6.9 MPa) or about 0 psig to about 550 psig (~3.8 MPa); and a gas hourly space velocity of reforming reactants of about 1000 $hr^{-1}$ to about 50,000 $hr^{-1}$.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of about 10 wt % to about 100 wt % of the methane in the reforming feed, for example about 20 wt % to about 100%, about 40 wt % to about 100%, about 50 wt % to about 100%, about 80 wt % to about 100%, about 85 wt % to about 100%, about 90 wt % to about 100%, about 95 wt % to about 100%, or about 98 wt % to about 100%. Additionally or alternatively, the reaction conditions can be suitable for conversion of about 10 wt % to about 100 wt % of the hydrocarbons in the reforming feed, for example about 20 wt % to about 100%, about 40 wt % to about 100%, about 50 wt % to about 100%, about 80 wt % to about 100%, about 85 wt % to about 100%, about 90 wt % to about 100%, about 95 wt % to about 100%, or about 98 wt % to about 100%.

In other aspects, for a reforming process where carbon dioxide is present in the reforming reaction environment (i.e., dry reforming or bi-reforming), the reaction conditions can be suitable for conversion of about 10 wt % to about 100 wt % of the methane in the reforming feed, for example about 20 wt % to about 100%, about 40 wt % to about 100%, about 50 wt % to about 100%, about 80 wt % to about 100%, about 85 wt % to about 100%, about 90 wt % to about 100%, about 95 wt % to about 100%, or about 98 wt % to about 100%. Additionally or alternately, the reaction conditions can be suitable for conversion of about 10 wt % to about 100 wt % of the hydrocarbons in the reforming feed, for example about 20 wt % to about 100%, about 40 wt % to about 100%, about 50 wt % to about 100%, about 80 wt % to about 100%, about 85 wt % to about 100%, about 90 wt % to about 100%, about 95 wt % to about 100%, or about 98 wt % to about 100%.

In various aspects, the ratio of $H_2$ to CO can be varied, such as by controlling the amount of $H_2O$ and $CO_2$ in the reaction environment. For example, the synthesis gas produced by reforming can have an $H_2$ to CO ratio of about 0.1 to about 15, such as about 0.1 to about 10, about 0.1 to about 3.5, about 0.1 to about 3.0, about 0.1 to about 2.4, about 0.1 to about 2.1, about 0.1 to about 1.9, about 0.1 to about 1.6, about 0.5 to about 15, about 0.5 to about 10, about 0.5 to about 3.5, about 0.5 to about 3.0, about 0.5 to about 2.4, about 0.5 to about 2.1, about 0.5 to about 1.9, about 0.5 to about 1.6, about 1.0 to about 15, about 1.0 to about 10, about 1.0 to about 3.5, about 1.0 to about 3.0, about 1.0 to about 2.4, about 1.0 to about 2.1, about 1.0 to about 1.9, about 1.0 to about 1.6, about 1.3 to about 15, about 1.3 to about 10, about 1.3 to about 3.5, about 1.3 to about 3.0, about 1.3 to about 2.4, about 1.3 to about 2.1, about 1.3 to about 1.9, about 1.6 to about 15, about 1.6 to about 10, about 1.6 to about 3.5, about 1.6 to about 3.0, about 1.6 to about 2.4, about 1.6 to about 2.1, about 1.9 to about 15, about 1.9 to about 10, about 1.9 to about 3.5, about 1.9 to about 3.0, about 1.9 to about 2.4, about 2.1 to about 15, about 2.1 to about 10, about 2.1 to about 3.5, about 2.1 to about 3.0, about 2.4 to about 15, about 2.4 to about 10, about 2.4 to about 3.5, about 2.7 to about 15, about 2.7 to about 10, or about 2.7 to about 3.5.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of about 1.0 or less. In such alternative aspects, the reforming reaction can be performed at a lower average bed temperature, such as a temperature between about 500° C. to about 700° C. or between about 500° C. to about 600° C. In such aspects, the ratio of $H_2$ to CO can be about 0.3 to about 1.0, for example about 0.3 to about 0.9, about 0.3 to about 0.7, about 0.4 to about 1.0, about 0.4 to about 0.9, about 0.4 to about 0.7, about 0.5 to about 1.0, or about 0.5 to about 0.9. Performing the dry reforming reaction under these conditions can also lead to substantial coke production, which can require removal during regeneration in order to maintain catalytic activity.

Reverse Flow Reactor

A reactor configuration that can take advantage of the benefits of a thermally stable high surface area catalyst for hydrocarbon reforming is a reverse flow reactor. For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat can be (a) added to the reactor bed(s) or monolith(s) via in-situ combustion, and then (b) removed from the bed via in-situ endothermic reforming. This type of configuration can provide the ability to consistently manage and confine the high temperature bubble in a reactor region(s) that can tolerate such conditions long term. A reverse flow reactor system can allow the reforming and regeneration processes to be performed in a substantially continuous manner.

A reverse flow reactor system can include first and second reactors, oriented in a series relationship with each other with respect to a common flow path, and optionally but preferably along a common axis. The common axis may be horizontal, vertical, or otherwise. During a regeneration step, reactants can be permitted to combine or mix in a reaction zone to combust therein, in situ, and create a high temperature zone or heat bubble inside a middle portion of the reactor system. The heat bubble can correspond to a temperature that is at least about the initial temperature for reforming. Typically, the temperature of the heat bubble can be greater than the initial reforming temperature, as the temperature can typically decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor can also serve to displace a substantial portion, (as desired) of the heat produced by the reaction (e.g., the heat bubble), into and at least partially through the second reactor, but preferably not all of the way through the second reactor, to avoid waste of heat and overheating the second reactor. The flue gas may be exhausted through the second reactor, but preferably most of the heat can be retained within the second reactor. The amount of heat displaced into the second reactor during the regeneration step can additionally or alternatively be limited and/or determined by the desired exposure time/space velocity of the hydrocarbon feed gas in the reforming environment.

After regeneration or heating the second reactor media, in the next/reverse step or cycle, methane (and/or natural gas and/or another hydrocarbon) can be supplied/flowed through the second reactor, from the direction opposite the direction of flow during the heating step. The methane (feed) can contact the hot second reactor and mixer media, in the heat bubble region, to transfer the heat to the methane for reaction energy.

For some aspects, the basic two-step asymmetric cycle of a reverse flow regenerative bed reactor system is depicted in FIGS. 1a and 1b of FIG. 1 in terms of a reactor system having two zones/reactors; a first or recuperator/quenching zone (7), and a second or reaction/reforming zone (1). Both the reaction zone (1) and the recuperator zone (7) can contain regenerative monoliths and/or regenerative beds. Regenerative monoliths and beds, as used herein, can comprise materials effective in storing and transferring heat. The terms regenerative reactor monolith(s) and regenerative reactor bed(s) mean regenerative monolith(s) and/or bed(s) that may also be used for carrying out a chemical reaction. The regenerative monolith(s) and/or bed(s) may comprise bedding or packing material such as glass or ceramic beads or spheres, metal beads or spheres, ceramic (including zirconia) or metal honeycomb materials, ceramic tubes, extruded monoliths, and the like, provided they are competent to maintain integrity, to maintain functionality, and to withstand long term exposure to temperatures in excess of 1200° C., for example in excess of 1400° C. or in excess of 1600° C., which features can allow for some operating margin. Additionally, the regenerative monolith(s) and/or bed(s) that correspond to regenerative reactor monolith(s) or bed(s) can have a sufficiently high surface area to allow for coating/impregnation of the monolith or bed surface area with a desirable amount of catalyst.

As shown in FIG. 1a, at the beginning of the "reaction" step of the cycle, a secondary end 5 of the reaction zone 1 (also referenced herein as the reformer or second reactor) can be at an elevated temperature, as compared to the primary end 3 of the reaction bed 1, and at least a portion (including the first end 9) of the recuperator or quench zone 7, can be at a lower temperature than the reaction zone 1, to provide a quenching effect for the synthesis gas reaction product. A methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from the reformer bed 1 and endothermically react to produce the desired synthesis gas product. As this step proceeds, a shift in the temperature profile 2, as indicated by the arrow, can be created based on the heat transfer properties of the system. When the bed is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 1b. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 1b, similar to, but in opposite directions to, the graphs of the temperature gradients developed during the reaction cycle in FIG. 1a. Fuel and oxidant reactants may combust at a region proximate to the interface 13 of the recuperator zone 7 and the reaction zone 1. The heat recovered from the recuperator zone, together with the heat of combustion, can be transferred to the reaction zone, thermally regenerating the regenerative reaction monolith(s) and/or bed(s) 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants may not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 2:
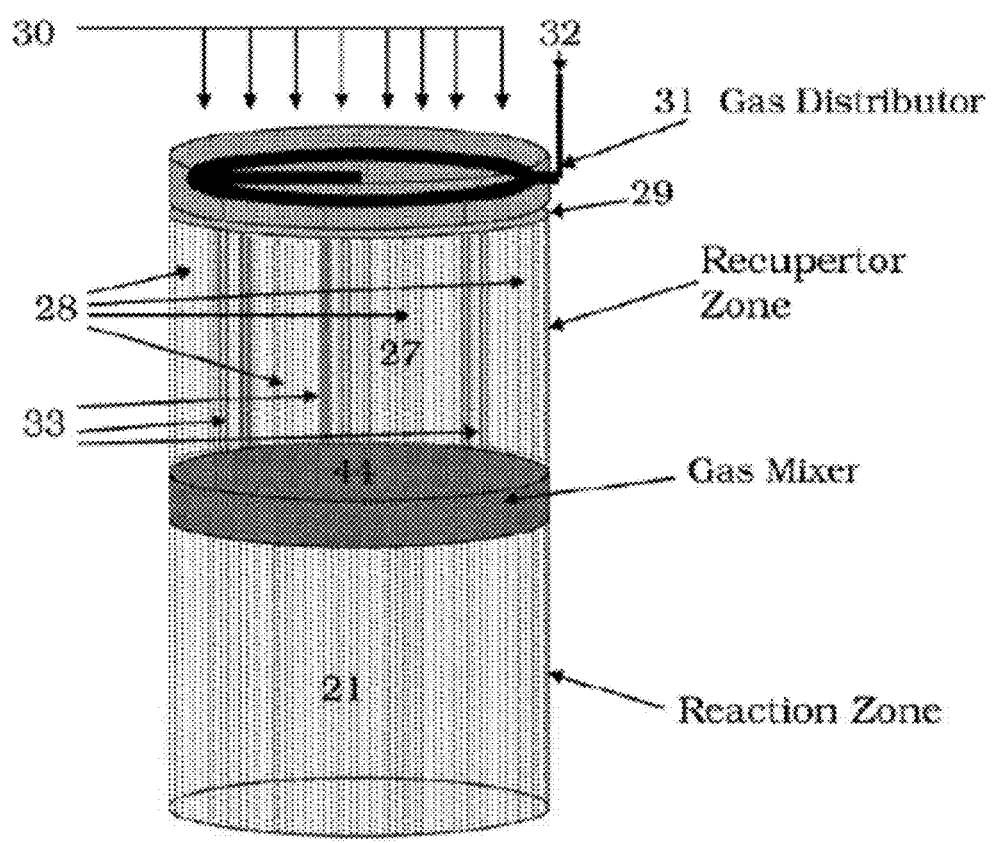
FIG. 2 schematically shows an example of a reverse flow reactor.

FIG. 2 illustrates another exemplary reactor system that may be suitable in some applications for controlling and deferring the combustion of fuel and oxidant to achieve efficient regeneration heat. FIG. 2 depicts a single reactor system, operating in the regeneration cycle. The reactor system may be considered as comprising two reactors or reaction zones. The recuperator 27 can be the zone primarily where quenching takes place and can provide substantially isolated flow paths or channels for transferring both of the quenching reaction gases through the reactor media, without incurring combustion until the gases arrive proximate or within the reactor core 13 in FIG. 1. The reformer 2 can be the reactor where regeneration heating and methane (and/or hydrocarbon) reformation can primarily occur and may be considered as the second reactor for purposes herein. Although the first and second reactors in the reactor system are identified as separately distinguishable reactors, it should be understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed arranged differently from, and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function as conduit walls), to prevent cross flow or mixing between the first and second reactants and/or to maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that, at the interface between channels, a number of conduits may convey a mixture of first and second reactant, but this number of conduits is believed to be proportionately small.

Alternative embodiments may use reactor media other than the described monoliths, such as whereby the channel conduits/flow paths may include a more tortuous pathway (e.g. convoluted, complex, winding and/or twisted but not linear or tubular) than the previously described monoliths, including but not limited to labyrinthine, variegated flow paths, conduits, tubes, slots, and/or a pore structure having channels through a portion(s) of the reactor and may include a barrier portion, such as along an outer surface of a segment or within sub-segments, having substantially no effective permeability to the relevant gases, and/or other means suitable for preventing cross flow between the reactant gases and maintaining the first and second reactant gases substantially separated from each other while axially transiting the recuperator 27. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, a mesh-type lattice structure, or some combination thereof.

In some aspects, the reverse flow reactor can include some type of equipment or method to direct a flow stream of one of the reactants into a selected portion of the conduits. In the exemplary embodiment of FIG. 2, a gas distributor 31 can direct a second gas stream 32 to second gas stream channels substantially isolated from, or not in fluid communication with, the first gas channels, here illustrated as channels 33. The result can be that at least a portion of gas stream 33 can be kept separate from gas stream 30 during axial transit of the recuperator 27. In some aspects, the regenerative bed(s) and/or monolith(s) of the recuperator zone can comprise channels having a gas and/or fluid barrier isolating the first reactant channels from the second reactant channels. Thereby, both of the at least two reactant gases that transit the channel means may fully transit the regenerative bed(s), to quench the regenerative bed, absorbing heat into the reactant gases, before combining to react with each other in the combustion zone.

In various aspects, gases (including fluids) 30 and 32 can each comprise a component that can react with a component in the other reactant 30 and 32, to produce an exothermic reaction when combined. For example, each of the first and second reactant may comprise one of a fuel gas and an oxidant gas that can combust/burn when combined with the other of the fuel and oxidant. By keeping the reactants substantially separated, the location of the heat release that occurs due to exothermic reaction can be controlled. In some aspects, "substantially separated" can be defined to mean that at least 50 mol %, for example at least 75 mol % or at least 90 mol %, of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised ~100 moles of air (~80 moles of $N_2$ and ~20 moles of $O_2$), and gas 32 comprised ~10 moles of hydrogen, then the maximum stoichiometric reaction would be the combustion of ~10 moles of hydrogen ($H_2$) with ~5 moles of oxygen ($O_2$) to make ~10 moles of $H_2O$. In such a case, if ~10 moles of hydrogen were actually combusted in the recuperator zone (27), this would represent ~100% reaction of the regeneration stream. This is despite the presence of residual un-reacted oxygen, because, in this example, the un-reacted oxygen is present in amounts above the stoichiometric requirement. Thus, in this example, the hydrogen would be the stoichiometrically limiting component. Using this definition, less than ~50% reaction, for example less than 25% reaction or less than 10% reaction, of the regeneration streams can occur during the axial transit of the recuperator (27).

In various aspects, channels 28 and 33 can comprise ceramic (including zirconia), alumina, and/or other refractory material capable of withstanding temperatures exceeding about 1200° C., for example exceeding about 1400° C. or exceeding about 1600° C. Additionally or alternately, channels 28 and 33 can have a wetted area between about 50 $ft^{-1}$ and about 3000 $ft^{-1}$, for example between about 100 $ft^{-1}$ and about 2500 $ft^{-1}$ or between about 200 $ft^{-1}$ and about 2000 $ft^{-1}$.

Referring again briefly to FIG. 1, the reactor system can include a first reactor 7 containing a first end 9 and a second end 11, and a second reactor 1 containing a primary end 3 and a secondary end 5. The embodiments illustrated in FIGS. 1 and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other can be supplied to that respective end of the reactor through slots or ports in the circumferential or perimeter outer surface on the respective end of the reactor.

ADDITIONAL EMBODIMENTS

The invention can additionally or alternatively include any one or more of the following embodiments.

Embodiment 1

A catalyst comprising about 0.1 wt % to about 10.0 wt % of a Group VIII metal, a Group IX metal, or a combination thereof on a lanthanum-stabilized alumina support, the lanthanum-stabilized alumina support comprising theta-alumina and/or having a thermally stable surface area of about 10 $m^2/g$ to about 60 $m^2/g$, for example about 10 $m^2/g$ to about 50 $m^2/g$, about 20 $m^2/g$ to about 60 $m^2/g$, about 20 $m^2/g$ to about 50 $m^2/g$, about 25 $m^2/g$ to about 60 $m^2/g$, about 25 $m^2/g$ to about 50 $m^2/g$, about 30 $m^2/g$ to about 60 $m^2/g$, or about 30 $m^2/g$ to about 50 $m^2/g$.

Embodiment 2

The catalyst of Embodiment 1, wherein the Group VIII metal, Group IX metal, or combination thereof has a dispersion value of at least 0.20, for example at least 0.25, at least 0.30, or at least 0.35.

Embodiment 3

The catalyst of Embodiment 1 or Embodiment 2, the catalyst being deposited on a surface of a monolith having an average wetted surface area per unit volume that ranges from about 50 $ft^{-1}$ to about 3000 $ft^{-1}$, for example from about 100 $ft^{-1}$ to 2500 $ft^{-1}$ or from about 200 $ft^{-1}$ to 2000 $ft^{-1}$, the monolith optionally comprising alumina, zirconia, silicon carbide, or a combination thereof.

Embodiment 4

A method for forming a catalyst, comprising: depositing about 1.0 wt % to about 15 wt % of lanthanum, relative to a weight of support, on an alumina support having a first support surface area of at least about 150 $m^2/g$; calcining the alumina support at a temperature of at least about 800° C. for about 0.5 hours to about 24 hours to form a lanthanum-stabilized alumina support having a thermally stable surface area of about 10 $m^2/g$ to about 60 $m^2/g$; and depositing about 0.1 wt % to about 10 wt % of a Group VIII metal, Group IX metal, or combination thereof, relative to a weight of support, on the lanthanum-stabilized alumina support.

Embodiment 5

The method of Embodiment 4, wherein the alumina support has a surface area of at least about 200 $m^2/g$, for example at least about 250 $m^2/g$, at least about 300 $m^2/g$, or at least about 350 $m^2/g$.

Embodiment 6

The method of Embodiment 4 or Embodiment 5, wherein from about 2.0 wt % to about 10 wt % of lanthanum is deposited on the alumina support, for example from about 2.0 wt % to about 6.0 wt % or from about 3.0 wt % to about 5.0 wt %.

Embodiment 7

The method of any of Embodiments 4-6, wherein the depositing lanthanum on the alumina support comprises depositing a lanthanum-containing precursor on the alumina support, the method further comprising calcining the alumina support after depositing the lanthanum-containing precursor at a temperature of about 200° C. to about 800° C. for about 0.5 hours to about 72 hours.

Embodiment 8

The method of Embodiment 7, wherein after calcining the alumina support at a temperature of about 200° C. to about 800° C. for about 0.5 hours to about 72 hours, the alumina support has a partially calcined support surface area of at least about 100 $m^2/g$, for example at least about 150 $m^2/g$ or at least about 200 $m^2/g$.

Embodiment 9

The method of Embodiment 7 or Embodiment 8, wherein, after calcining the alumina support at a temperature of about 200° C. to about 800° C. for about 0.5 hours to about 74 hours, the alumina support has a partially calcined support surface area that is lower than the first support surface area by about 150 $m^2/g$ or less, for example by about 125 $m^2/g$ or less or by about 100 $m^2/g$ or less.

Embodiment 10

The method of any of Embodiments 7-9, further comprising drying the alumina support after depositing the lanthanum-containing precursor at a temperature of about 90° C. to about 200° C. for about 0.5 hours to about 24 hours.

Embodiment 11

The method of any of Embodiments 4-10, further comprising forming a coating on a surface of a monolith, the coating comprising the Group VIII metal, Group IX metal, or combination thereof deposited on the catalyst support, the monolith having an average wetted surface area per unit volume that ranges from about 50 $ft^{-1}$ to about 3000 $ft^{-1}$, for example from about 100 $ft^{-1}$ to 2500 $ft^{-1}$ or from about 200 $ft^{-1}$ to 2000 $ft^{-1}$, the monolith optionally comprising alumina, zirconia, silicon carbide, or a combination thereof.

Embodiment 12

The method of any of Embodiments 4-11, wherein the lanthanum-stabilized alumina support comprises theta-alumina.

Embodiment 13

The catalyst or method for forming a catalyst of any of the above embodiments, wherein the Group VIII metal, Group IX metal, or combination thereof comprises Rh, Ni, Co, Pd, Pt, or a combination thereof, for example comprises Rh, Ni, Pt, or a combination thereof, or comprises at least Rh.

Embodiment 14

The catalyst or method for forming a catalyst of any of the above embodiments, wherein the alumina support exhibits a thermally stable surface area having a surface area change of less than about 25% after exposure to a temperature of about 1000° C. for about 24 hours in an atmosphere comprising about 2 vol % to about 30 vol % $O_2$, optionally about 5 vol % to about 30 vol % $O_2$ or about 10 vol % to about 30 vol % $O_2$, and comprising about 60 vol % to about 98 vol % of an inert gas, optionally about 70 vol % to about 98 vol % of inert gas, the atmosphere optionally being air.

Embodiment 15

A method for reforming a hydrocarbon-containing stream, comprising: exposing a hydrocarbon-containing stream to a catalyst according to any of Embodiments 1-3 and 13-14 and/or to a catalyst made according to the method of any of Embodiments 4-14 in the presence of at least one of $H_2O$ and $CO_2$ under effective reforming conditions to form a synthesis gas product having an $H_2$ to CO ratio of about 0.1 to about 15, for example about 0.1 to about 10 or about 0.5 to about 3.5.

Embodiment 16

The method of Embodiment 15, wherein the effective reforming conditions comprise an average reforming zone temperature of at least about 1000° C. and/or a peak reactor temperature of at least about 1200° C.

Embodiment 17

The method of Embodiment 15 or Embodiment 16, wherein the hydrocarbon-containing stream is exposed to the catalyst in a reverse flow reactor.

Embodiment 18

The method of any of Embodiments 15-17, wherein the hydrocarbon-containing stream comprises at least about 5 wt % $C_{2+}$ hydrocarbons, at least about 50 wt % methane, or a combination thereof.

Embodiment 19

A regeneration effluent formed during a swing reforming process, the regeneration effluent formed by a method comprising: reforming a hydrocarbon-containing stream in a reactor in the presence of a reforming catalyst under effective reforming conditions, the hydrocarbon-containing stream comprising at least about 1 wppm of sulfur, to form a synthesis gas product effluent; and performing a regeneration process in the reactor under effective regeneration conditions to form the regeneration effluent, the regeneration effluent comprising at least about 0.1 wppm sulfur.

Embodiment 20

The regeneration effluent of Embodiment 19, wherein the reforming catalyst comprises a catalyst according to any of Embodiments 1-3 and 12-13 and/or to a catalyst made according to the method of any of Embodiments 4-13.

Embodiment 21

The regeneration effluent of Embodiment 19 or Embodiment 20, wherein the effective reforming conditions comprise at least one of an average reforming zone temperature of at least about 1000° C. or a peak reactor temperature of at least about 1200° C.

Example 1—Preparation of Thermally Stable Catalyst Support

Figure 3:
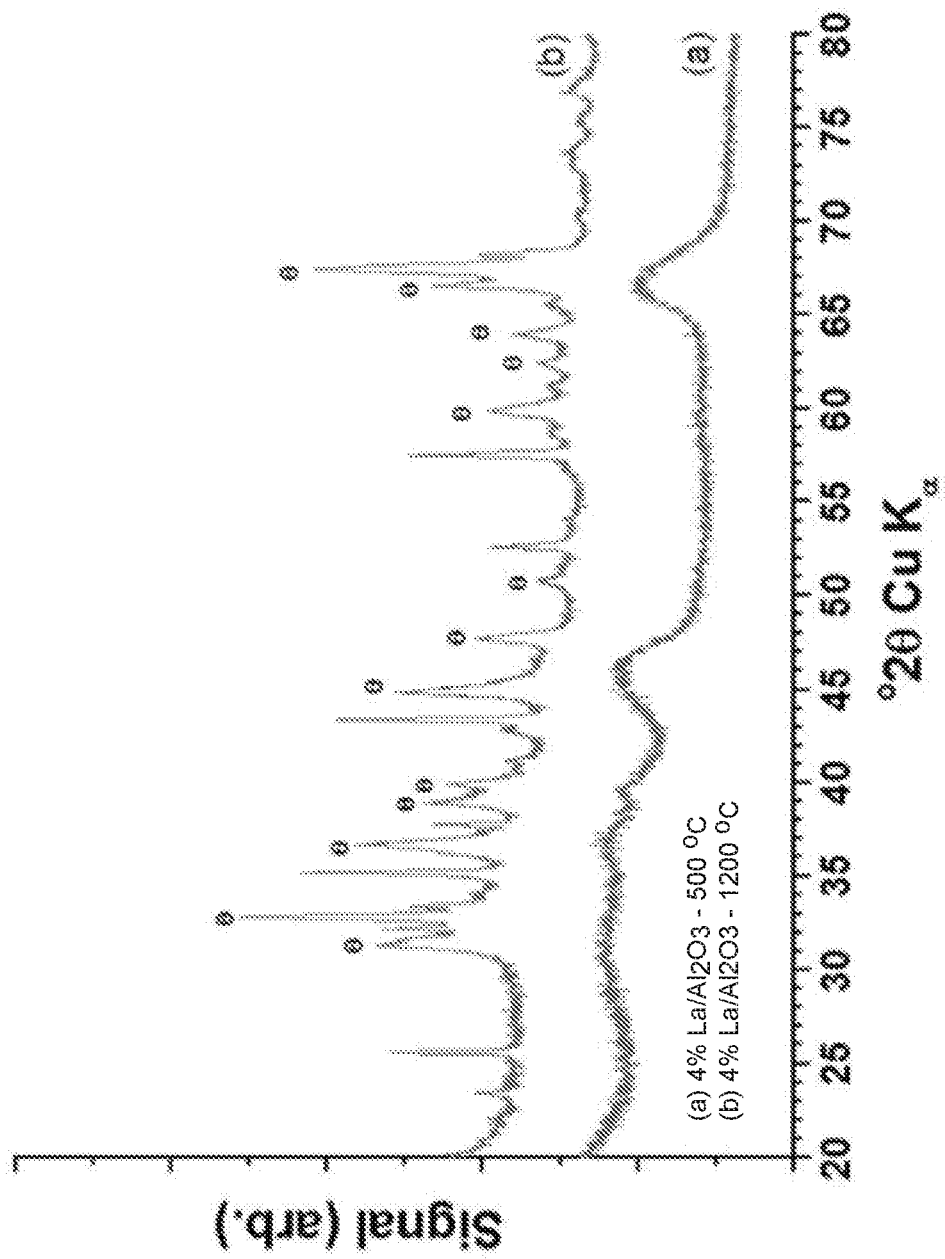
FIG. 3 shows X-ray diffraction data from various catalyst supports.

A lanthanum doped alumina support was synthesized via metal impregnation of an amorphous phase alumina via incipient wetness with an aqueous solution containing lanthanum nitrate hexahydrate. The metal impregnated support was dried in still air at about 120° C. for ~12 hours followed by calcination in flowing air at about 500° C. for ~4 hours to decompose the nitrate metal complex after impregnation. The total surface area (BET) of the amorphous phase alumina was about 407 $m^2/g$ before the calcination for decomposition and about 301 $m^2/g$ afterwards. The lanthanum impregnated material was then calcined at about 1200° C. for ~8 hours to synthesize a stable theta phase alumina that had a surface area of about 39 $m^2/g$, which represents a significantly higher surface area than a typical high density cubic alpha alumina phase (~1 $m^2/g$). The presence of the higher surface area theta phase alumina was verified by x-ray diffraction, as shown in FIG. 3. In FIG. 3, the lower plot shows the x-ray diffraction pattern for the catalyst support after the calcination for decomposition at ~500° C. but before the calcination at ~1200° C. The lower plot appears to show a lack of distinctive peaks, which was believed to be indicative of an amorphous phase or another type of phase with minimal amounts of long range order, such as possibly a gamma-alumina phase. By contrast, the upper plot shows the x-ray diffraction pattern after the calcination at ~1200° C. The upper plot appears to show clear distinct peaks believed to correspond to a theta-alumina phase.

Example 2—Preparation of Rhodium Catalyst

A rhodium impregnated lanthanum-stabilized theta-alumina support was synthesized via metal impregnation of an aqueous solution containing rhodium nitrate hydrate onto a support prepared according to the procedure in Example 1. The rhodium impregnated support was then dried in still air at about 120° C. for ~12 hours followed by a calcination in flowing air at about 600° C. for ~4 hours to decompose the nitrate metal complex after impregnation. The estimated dispersion, or fraction of metal surface area, was determined by the strong chemisorption of carbon monoxide and was determined to be CO/Rh≈0.41.

Example 3—Preparation of Catalytic Monoliths by Washcoating

Catalytic monoliths were prepared by washcoating of alumina monoliths that had a cell density of about 900 cells per square inch (cpsi). The monoliths had a porosity of about 30%. Two sizes of monoliths were prepared using the washcoat. One type of monolith was a 1"×½" monolith that was suitable for use in a lab scale flow reactor. A second type of monolith was a 2"×2½" monolith suitable for use or testing in a pilot-scale reverse flow reactor. For both types of monoliths, the wash coating procedure was similar. The blank monoliths were sequentially cleaned and sonicated with acetone, ethanol, and water. The blank monoliths were then calcined at ~600° C. overnight in still air. A washcoating solution was prepared by adding an Rh/La—$Al_2O_3$ catalyst as described in Example 2 and an α-$Al_2O_3$ binder (~0.2 µm particles) to distilled and deionized water to make an aqueous suspension with approximately 15-30% solids. A mineralizing agent (acetic acid) was then added to prevent agglomeration of the alumina particles. A pH between ~3 and ~4 was obtained. The washcoating solution was then ball milled with cylindrical alumina agates that filled up about 70% of the ball mill. The suspension was ball milled for about 16 hours to reduce the Rh/La—$Al_2O_3$ particle size to about 2 µm, as shown below. The ball milled washcoat aqueous suspension was then continuously mixed with a stir bar in a covered beaker prior to washcoating. A small amount of fish oil and surfactant were added to the washcoat suspension to reduce any resultant foaming.

A substantially uniform washcoat of a monolith was produced by dipping a monolith into the washcoat suspension, followed by removal of excess slurry from the monolith channels by either gas purge or vacuum, or a combination of both methods. After dip coating and clearing the channels of excess coating, the monolith was dried at about 120° C. followed by an about 600° C. calcination. The procedure was then repeated until the targeted amount of catalyst material (as shown in Table 1) was attained on the post-calcined monolith. The results from washcoating of three 2"×2½" monoliths and one 1"×½" monolith are shown in Table 1.

described in Table 1 was wrapped in a high temperature alumina cloth to prevent bypassing and loaded into a quartz reactor with an inlet diameter of approximately 0.6". A thermocouple was located directly above the top of and directly below the bottom of the catalytic monolith. The catalyst testing procedure included regeneration, activation, and activity steps. The gas flow during the catalyst regeneration step was a blend of air and $N_2$ to achieve ~5% $O_2/N_2$ at ~200 sccm for ~20 minutes. After an inert $N_2$ purge for ~10 minutes, the activation step was a blend of $H_2$ and $N_2$ to achieve ~10% $H_2/N_2$ at ~200 sccm for ~20 minutes. Another $N_2$ purge was followed by dry, bi, or steam reforming for ~3 hours. The regeneration and reduction cycle was then repeated before another reforming step. The methane and carbon dioxide conversion was determined by the disappearance of the reactant. The syngas ratio was calculated as the molar ratio of $H_2$ and CO in the products.

Figure 4:
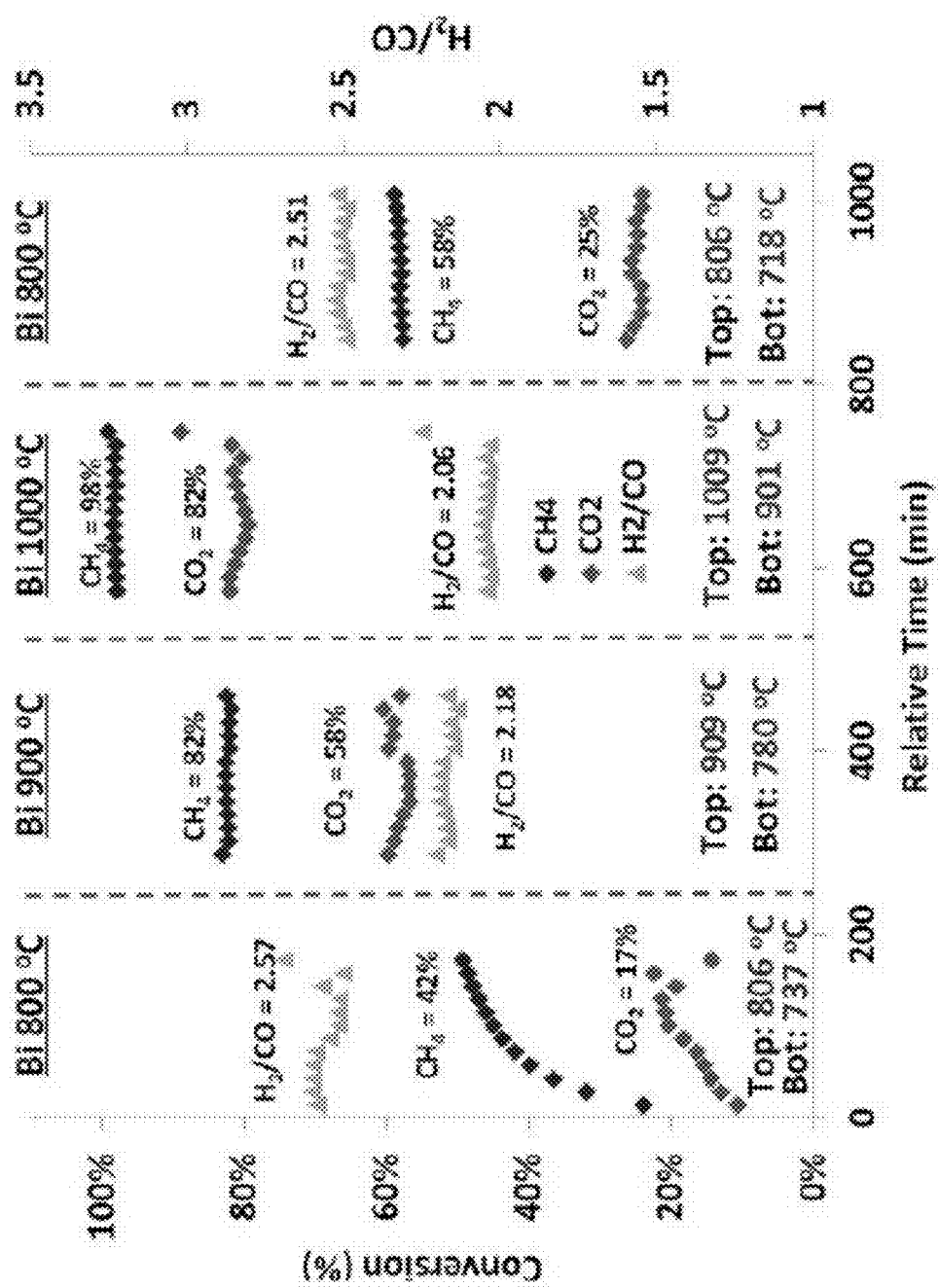
FIGS. 4-5 show results from reforming of methane in a down-flow reactor in the presence of a rhodium catalyst washcoated monolith.

The simultaneous reforming of methane and carbon dioxide (bi-reforming) was performed on the catalytic monolith with a space velocity of ~10,800 $hr^{-1}$ based on total monolith volume and a gas composition of ~40.8% $CH_4$, ~32.8% $H_2O$, ~16.4% $CO_2$, and ~10% $N_2$. Results for reforming at ~800° C., ~900° C., and ~1000° C. (oven set temperatures) are shown in FIG. 4. The temperatures labelled "Top" and "Bot" are measured temperatures from thermocouples inserted at the top and bottom of the catalyst bed, as defined above. The vertical dotted lines represent the regeneration and activation procedure at the temperature of the following reforming conditions. The data points between the dotted lines correspond to either the amount of methane converted relative to the methane in the feed (labeled $CH_4$), the amount of $CO_2$ converted relative to the $CO_2$ in the feed (labeled $CO_2$), or the ratio of $H_2$ to CO in the synthesis gas product produced at the reforming conditions (labeled $H_2$/CO). The average values for each series of data points are shown along with the label for each set of data points. As shown in FIG. 4, at a temperature of ~1000° C. (average reforming zone temperature ~955° C.), the catalytic monolith was capable of converting ~98% of methane and ~82% of carbon dioxide to products with a syngas ratio ($H_2$/CO) of approximately 2.06. While some initial activation of the catalytic monolith was observed at the initial reforming temperature of ~800° C. (average reforming zone temperature ~772° C.), little to no deactivation was observed over the ~3 hours at each temperature point. This can also be seen in the final reforming reaction at ~800° C. (average reforming zone temperature ~762° C.), which was performed after the reforming at

TABLE 1

Monolith Characteristics

| Alumina Monolith | Monolith A | Monolith B | Monolith C | Monolith D |
|---|---|---|---|---|
| Dimensions (L × Dia) | 2" × 2½" | 2" × 2½" | 2" × 2½" | 1" × ½" |
| Starting Weight (g) | 215.87 | 218.56 | 218.40 | 4.76 |
| Final Weight (g) | 236.01 | 240.11 | 243.04 | 5.23 |
| Washcoat Weight (g) | 20.14 | 21.55 | 24.64 | 0.47 |
| Washcoat/Monolith (wt %) | 8.5 | 9.0 | 10.1 | 10.9 |
| Rhodium/Monolith (wt %) | 0.40 | 0.42 | 0.48 | 0.35 |

Example 4—Evaluation of Washcoated Monoliths

Following the catalytic monolith preparation, the performance of the catalytic monoliths for methane reforming was evaluated. Methane reforming with both steam and carbon dioxide was tested in a lab scale fixed-bed, non-cycling down-flow reactor. The ~900 cpsi 1"×½" monolith ~1000° C. In the final reforming at ~800° C., no apparent deactivation due to the prior reforming at ~1000° C. could be observed.

Figure 5:
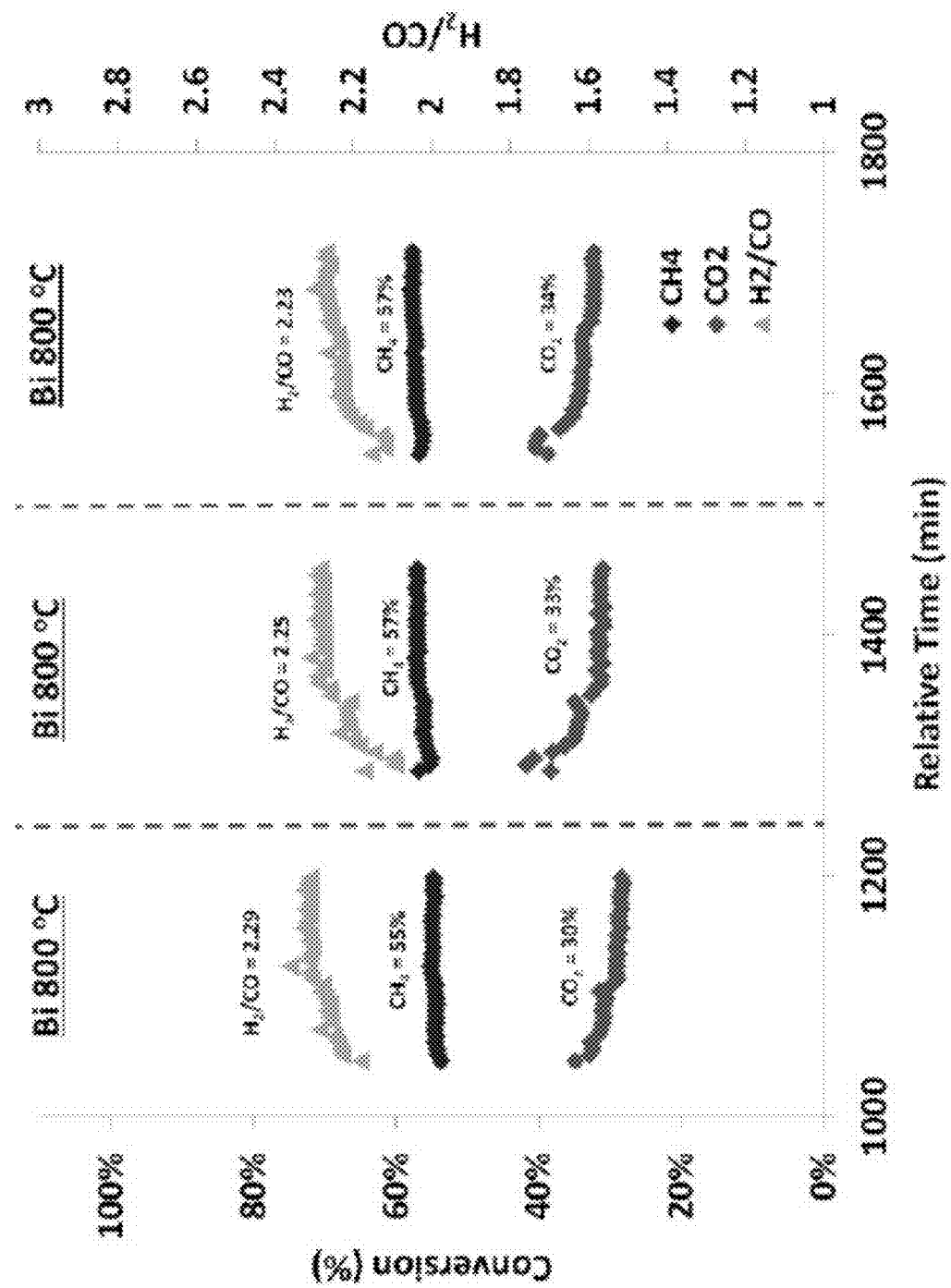

To further investigate the thermal stability, additional process runs were performed using a catalyst monolith similar to the catalyst monolith used in FIG. 4. These additional runs were performed under conditions similar to the final ~800° C. reforming reaction in FIG. 4. The results from the additional runs are shown in FIG. 5. As shown in FIG. 5, the catalyst monolith appeared to show consistent activity for methane bi-reforming over multiple ~800° C. ~3 hour experiments. Little to no deactivation was observed for methane conversion between experiments.

Example 5—Second Evaluation of Washcoated Monoliths

Figure 6:
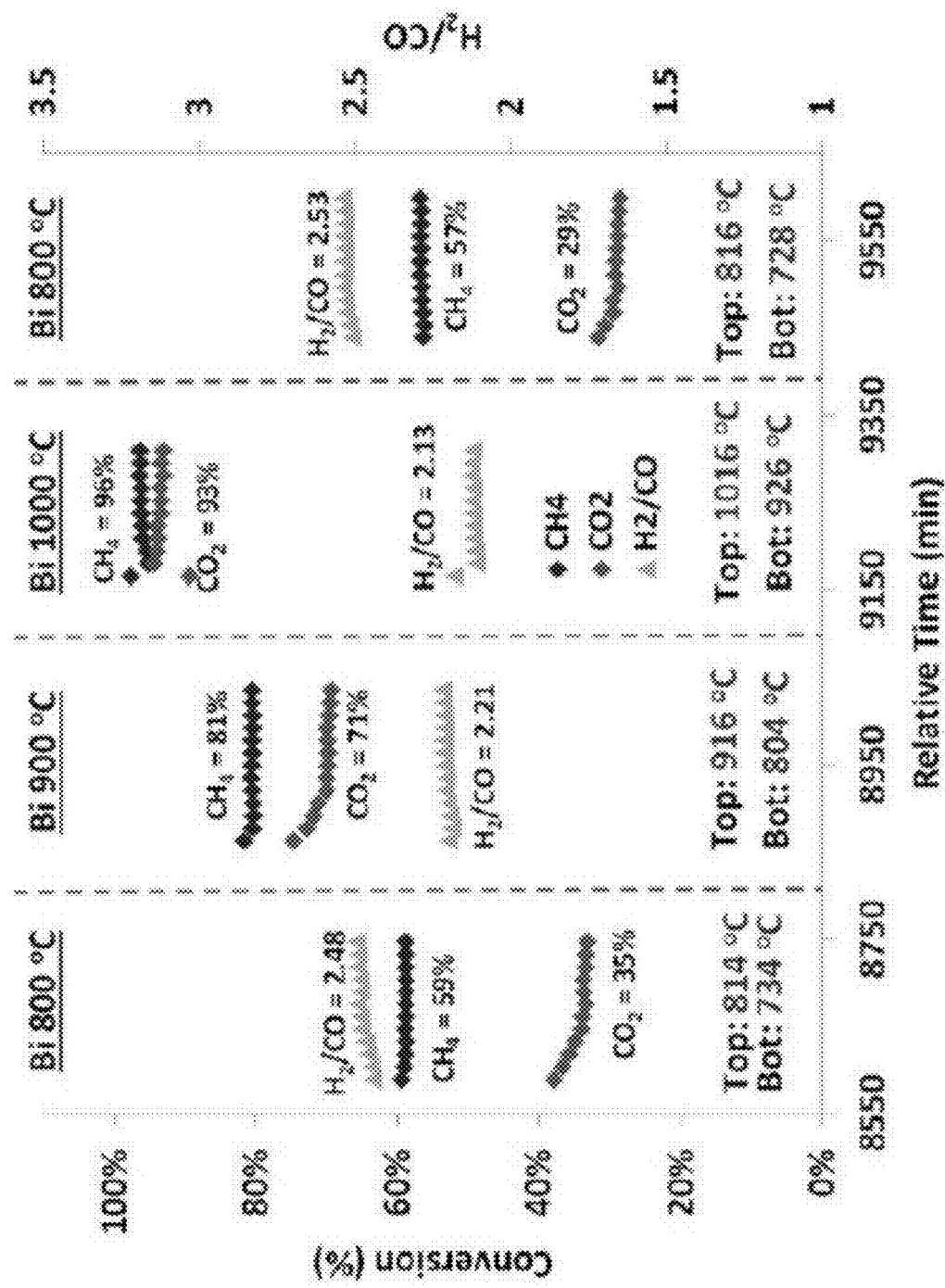
FIG. 6 shows results from reforming of methane in a reverse flow reactor in the presence of a rhodium catalyst washcoated monolith.

The bi-reforming of methane was also evaluated under the conditions in Example 4 over the same catalytic monolith used for the data in FIG. 3 with a space velocity of ~7,500 hr$^{-1}$ based on total monolith volume and a gas composition (by volume) of ~47.4% $CH_4$, ~32.5% $H_2O$, ~13.9% $CO_2$, and ~6.2% $N_2$. The results of the second evaluation are shown in FIG. 6. It is noted that, as the temperature was increased, the measured values appeared to move closer to equilibrium values predicted using a commercially available chemical modeling package, with the measured values at about 1000° C. being close to the predicted equilibrium values.

At a temperature of about 1000° C. (average reforming zone temperature about 971° C.), the catalytic monolith was capable of converting ~93%+ carbon (both methane and $CO_2$) to products with a syngas ratio ($H_2$/CO) of approximately 2.13. The higher conversion of carbon dioxide observed at these reaction conditions (as compared with Example 4) are believed to be because of the decrease in excess reactant ($H_2O+CO_2$)/$CH_4$ ratio of ~1.03 compared to ~1.27 in Example 4. The catalytic monolith appeared to be capable of the bi-reforming of methane at high temperature for multiple hours.

Examples 6 to 11—Additional Evaluations of Rh-Monolith Catalysts

Additional examples of the activity of a catalyst monolith similar to the Monolith D in Table 1 for bi and steam reforming are summarized in the Table 2. The dry reforming of methane (~45% $CH_4$, ~45% $CO_2$, ~10% $N_2$ by volume) was capable of producing a $H_2$/CO ratio of ~1.01 while steam reforming (~40% $CH_4$, ~50% $H_2O$, ~10% $N_2$ by volume) was able to produce a syngas ratio of ~3.26. The monolith was capable of converting ~100% of methane during dry and bi-reforming at a temperature of about 1100° C. and ambient pressure. The rhodium containing washcoated monolith appeared not only active for steam, bi, and dry reforming of methane, but also appeared not to show significant deactivation despite being exposed to temperatures of up to ~1150° C. Visual examination of the monolith after removing if from the reactor indicated that the washcoat appeared to maintain its mechanical integrity.

TABLE 2

Additional Reforming Evaluations (Down-Flow Non-Cyclic Reactor)

| Example | Reforming Type | GHSV (hr$^{-1}$ × 10$^{-3}$) | Temperature (° C.) | CH4 Conv. (%) | CO2 Conv. (%) | H2/CO |
|---|---|---|---|---|---|---|
| 6 | Steam | 10.8 | 1000 | 100 | — | 3.26 |
| 7 | Bi | 10.8 | 1000 | 98 | 82 | 2.06 |
| 8 | Bi | 16.2 | 1100 | 100 | 88 | 2.02 |
| 9 | Bi | 16.2 | 1150 | 100 | 92 | 1.99 |
| 10 | Dry | 10.8 | 1000 | 99 | 99 | 1.06 |
| 11 | Dry | 16.2 | 1100 | 100 | 99 | 1.01 |

Examples 12 to 20—RFR Pilot Plant Testing Using Rh/La—$Al_2O_3$ Washcoated Monolith Catalyst The three ~900 cpsi catalytic monoliths shown in Table 1 were also used to perform steam, bi, and dry reforming at temperatures up to ~1300° C. and at ~55 psig with minimal deactivation for over 3,500 cycles in a pilot-scale reverse flow reactor (RFR). The heat for the endothermic reforming reactions was generated by hydrogen combustion during the regeneration/combustion step. In Examples 12 to 18, a complete cycle corresponded to about 30 seconds of combustion followed by about 30 seconds of reforming. The catalytic monoliths were packed in the "Reactive" zone of a reactor similar to the configuration shown in FIG. 2. The quench area of the reactor contained two non-catalytic ~100 cpsi monoliths. The entire bed length was ~12" with a diameter of ~2.5".

The results from reforming in the pilot scale reverse flow reactor are summarized in Table 3. The catalyst was capable of steam, bi, and dry reforming at high temperature and pressure of ~0 to ~55 psig. The methane conversion was as high as ~95%. The syngas ratio produced was from ~1 to ~3. The catalytic monoliths appeared stable and active after cyclic exposure to combustion and reforming conditions in alternative directions. The operating pressure of the reactor during a cycle is shown in Table 3. For each run, the combustion portion of the cycle was performed to achieve a peak temperature of about 1300° C.

TABLE 3

Reforming in Reverse Flow Reactor

| Example | Reforming Type | GHSV (h$^{-1}$ × 10$^{-3}$) | CH4 (scfm) | CO2 (scfm) | H2O (sccm) | Pressure (psig) | CH4 Conv. (%) | CO2 Conv. (%) |
|---|---|---|---|---|---|---|---|---|
| 12 | Steam | 3.8 | 0.5 | 0 | 13.31 | 0 | 95.1 | — |
| 13 | Bi | 3.8 | 0.5 | 0.21 | 8.74 | 0 | 94.1 | 75.2 |
| 14 | Bi | 7.7 | 1.0 | 0.43 | 17.49 | 0 | 88.4 | 63.5 |
| 15 | Bi | 3.8 | 0.5 | 0.21 | 8.74 | 40 | 92.8 | 62.4 |
| 16 | Bi | 7.7 | 1.0 | 0.43 | 17.49 | 40 | 90.2 | 74.1 |
| 17 | Dry | 4.2 | 0.6 | 0.6 | — | 55 | 83.9 | 82.6 |
| 18 | Steam | 3.8 | 0.5 | 0 | 13.31 | 0 | 95.1 | — |
| 19* | Dry | 5.3 | 0.75 | 0.75 | — | 0 | 93.8 | 90.8 |
| 20* | Dry | 4.2 | 0.6 | 0.6 | — | 55 | 91.1 | 90.0 |

As shown in Table 3, the rhodium washcoated catalyst monolith was suitable for methane reforming at high conversion rates under various steam, dry, and bi reforming conditions. It is noted that alternative cycle lengths were used in Examples 19 and 20. While the dry reforming of methane only had an ~84% methane conversion at ~55 psig with about 30 seconds reforming and about 30 seconds combustion (Example 17), a methane conversion of ~91% and carbon dioxide conversion of ~90% with a $H_2/CO$ ratio of ~0.99 was achieved with a cycle corresponding to about 25 seconds of reforming and about 30 seconds of combustion (Example 20). In Example 19, a methane conversion of ~93.8% and carbon dioxide conversion of ~90.8% with a $H_2/CO$ ratio of ~1.06 was achieved using a cycle length of about 10 seconds of reforming and about 10 seconds of combustion.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A catalyst comprising about 0.1 wt % to about 10.0 wt % of a Group VIII metal, a Group IX metal, or a combination thereof on a lanthanum-stabilized alumina support, the lanthanum-stabilized alumina support having a thermally stable surface area of about 10 m²/g to about 60 m²/g and having an X-ray diffraction pattern after calcination at about 1200° C. as shown in FIG. 3,
wherein the lanthanum-stabilized alumina support has been calcined at a temperature below about 800° C. to reduce or minimize conversion of the alumina support to a lower surface area phase.

2. The catalyst of claim 1, wherein the Group VIII metal, Group IX metal, or combination thereof has a dispersion value of at least 0.20.

3. The catalyst of claim 1, wherein the Group VIII metal, Group IX metal, or combination thereof comprises Rh, Ni, Co, Pd, Pt, or a combination thereof.

4. The catalyst of claim 1, wherein the lanthanum-stabilized alumina support has a thermally stable surface area of about 20 m²/g to about 60 m²/g.

5. The catalyst of claim 1, wherein the lanthanum-stabilized alumina support comprises theta-alumina.

6. The catalyst of claim 1, the catalyst being deposited on a surface of a monolith having an average wetted surface area per unit volume that ranges from about 50 ft⁻¹ to about 3000 ft⁻¹.

7. The catalyst of claim 6, wherein the monolith comprises alumina, zirconia, silicon carbide, or a combination thereof.

8. A catalyst comprising about 0.1 wt % to about 10.0 wt % of a Group VIII metal, a Group IX metal, or a combination thereof on a lanthanum-stabilized theta-alumina support, wherein said support comprises about 3 to about 5 wt. % lanthanum and has an X-ray diffraction pattern after calcination at about 1200° C. as shown in FIG. 3
wherein the lanthanum-stabilized theta-alumina support has been calcined at a temperature below about 800° C. to reduce or minimize conversion of the alumina support to a lower surface area phase.

9. The catalyst of claim 8, wherein the Group VIII metal, Group IX metal, or combination thereof (i) comprises Rh, Ni, Co, Pd, Pt, or a combination thereof, (ii) has a dispersion value of at least 0.20, or (iii) both (i) and (ii).

* * * * *